US012083959B2

(12) United States Patent
Higuma et al.

(10) Patent No.: US 12,083,959 B2
(45) Date of Patent: Sep. 10, 2024

(54) IMAGE CONTROL SYSTEM

(71) Applicant: TOYOTA JIDOSHA KABUSHIKI KAISHA, Toyota (JP)

(72) Inventors: Tomohito Higuma, Toyota (JP); Jumpei Inagaki, Toyota (JP); Yosuke Kubota, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 187 days.

(21) Appl. No.: 17/975,083

(22) Filed: Oct. 27, 2022

(65) Prior Publication Data

US 2023/0140228 A1    May 4, 2023

(30) Foreign Application Priority Data

Oct. 29, 2021 (JP) ................................. 2021-177843

(51) Int. Cl.
*B60R 1/04* (2006.01)
*B60R 1/12* (2006.01)

(52) U.S. Cl.
CPC ................ *B60R 1/04* (2013.01); *B60R 1/12* (2013.01); *B60R 2001/1223* (2013.01)

(58) Field of Classification Search
CPC .. G03B 37/00; B60R 1/12; B60R 1/26; B60R 1/04; B60R 2300/303; B60R 2001/1223

USPC ........ 340/937, 936, 434, 436, 988; 382/104, 382/293, 103; 701/116, 117, 301
See application file for complete search history.

(56) References Cited

U.S. PATENT DOCUMENTS

2009/0079585 A1    3/2009 Chinomi et al.

FOREIGN PATENT DOCUMENTS

| JP | 2003-081014 A | 3/2003 |
| JP | 2009-081664 A | 4/2009 |
| JP | 2016-189576 A | 11/2016 |

*Primary Examiner* — Christopher Garft
*Assistant Examiner* — Michael McDuffie
(74) *Attorney, Agent, or Firm* — Dinsmore & Shohl LLP

(57) ABSTRACT

An image control system includes a rear camera, a left rear (right rear) camera, a display device, and an image control device for generating a combined image and displaying the combined image on the display device. The image control device identifies a rear target object and a left rear (right rear) target object which are closest to the vehicle in an own lane and a left lane (right lane), respectively, and changes a magnitude of the rear left-side (right-side) azimuth angle being an azimuth angle of a left (right) boundary line defining a horizontal angle of view of a rear effective range based on a combination of presence or absence of the rear target object and a level of closeness to this object and presence or absence of the left rear (right rear) target object and a level of closeness to this object.

11 Claims, 21 Drawing Sheets

<AZIMUTH ANGLE θ1>

| | | TARGET OBJECT (OWN LANE L) | | | |
|---|---|---|---|---|---|
| | | Z1 (CLOSE) | Z2 (INTERMEDIATE) | Z3 (FAR) | ABSENT |
| TARGET OBJECT (LEFT LANE Ll) | Z1 (CLOSE) | NARROW | NARROW | NARROW | NARROW |
| | Z2 (INTERMEDIATE) | WIDE | NO CHANGE | NO CHANGE | NO CHANGE |
| | Z3 (FAR) | WIDE | NARROW | WIDE | WIDE |
| | ABSENT | WIDE | NO CHANGE | NO CHANGE | NO CHANGE |

FIG.6A

<AZIMUTH ANGLE θ1>  M3

| | | TARGET OBJECT (OWN LANE L) | | | |
|---|---|---|---|---|---|
| | | Z1(CLOSE) | Z2 (INTERMEDIATE) | Z3(FAR) | ABSENT |
| TARGET OBJECT (LEFT LANE Ll) | Z1 (CLOSE) | NARROW | NARROW | NARROW | NARROW |
| | Z2 (INTERMEDIATE) | WIDE | NARROW | NARROW | NARROW |
| | Z3 (FAR) | WIDE | NARROW | NARROW | NARROW |
| | ABSENT | WIDE | NARROW | NARROW | NARROW |

FIG.14A

<AZIMUTH ANGLE $\theta r$>   M4

| | | TARGET OBJECT (OWN LANE L) | | | |
|---|---|---|---|---|---|
| | | Z1 (CLOSE) | Z2 (INTERMEDIATE) | Z3 (FAR) | ABSENT |
| TARGET OBJECT (RIGHT LANE Lr) | Z1 (CLOSE) | NARROW | NARROW | NARROW | NARROW |
| | Z2 (INTERMEDIATE) | WIDE | NARROW | NARROW | NARROW |
| | Z3 (FAR) | WIDE | NARROW | NARROW | NARROW |
| | ABSENT | WIDE | NARROW | NARROW | NARROW |

FIG.14B

IMAGE CONTROL SYSTEM

CROSS-REFERENCE TO RELATED APPLICATIONS

This application claims priority to Japanese Patent Application No. 2021-177843 filed on Oct. 29, 2021, which is incorporated herein by reference in its entirety including the description, claims, drawings, and abstract.

BACKGROUND

1. Field

The present disclosure relates to an image control system for generating a panorama-format combined image from pieces of image data acquired by a plurality of image pickup devices, and displaying the combined image on a display device.

2. Description of the Related Art

Hitherto, there has been known a technology of generating a panorama-format combined image from pieces of image data acquired by a plurality of image pickup devices (typically, in-vehicle cameras), and displaying the combined image on a display device. For example, an image display control apparatus as described in Japanese Patent Application Laid-open No. 2016-189576 (hereinafter also referred to as "related-art apparatus") acquires a first rear image, a second rear image, and a third rear image. The first rear image is obtained by picking up an image of a rear side of a vehicle body from a rear portion of the vehicle body. The second rear image is obtained by picking up an image of a right rear side of the vehicle body. The third rear image is obtained by picking up an image of a left rear side of the vehicle body.

When the related-art apparatus determines that an object is detected based on those rear images, the related-art apparatus converts each of the first to third rear images so that, through use of a homography calculated based on a distance from the rear portion of the vehicle body to the object, an angle of view of the first rear image is increased as this distance is decreased. Then, the related-art apparatus combines the converted rear images so as to generate a panorama-format combined image viewed from a rear end portion of the vehicle body as a viewpoint, and displays the combined image on the display device. In Japanese Patent Application Laid-open No. 2016-189576, the object is described as "obstacle."

In Japanese Patent Application Laid-open No. 2016-189576, it is described that, according to the related-art apparatus, the entire object can be displayed in the combined image with seams of the combined image being smooth. However, in the configuration of the related-art apparatus, when a plurality of objects are detected, there is a possibility that those objects cannot be appropriately displayed in the combined image. That is, the related-art apparatus is configured to convert, for one detected object, the first to third rear images so that the angle of view of the first rear image is increased as the distance from the rear portion of the vehicle body to this object is decreased. Accordingly, it is considered that for this object, the entire object can be displayed when the above-mentioned conversion processing is performed. However, in Japanese Patent Application Laid-open No. 2016-189576, there is no discussion about how to convert each rear image when other objects are detected. Thus, there is a possibility that those other objects are not appropriately displayed in the combined image, and as a result, there is a possibility that reduction in traveling safety of the vehicle is caused.

However, when it is attempted to appropriately display all of the detected objects in the combined image, there is a possibility that the conversion processing becomes complicated and a processing load of the related-art apparatus is consequently increased.

SUMMARY

The present disclosure has been made in order to cope with the above-mentioned problems. That is, the present disclosure has an object to provide an image control system capable of achieving both of appropriate display of an object having a relatively high possibility of affecting traveling of a vehicle in a combined image, and suppression of an increase of a processing load applied when the combined image is generated.

According to at least one embodiment of the present disclosure, there is provided an image control system (hereinafter also referred to as "the present system") including: a rear image pickup device (11Re) configured to pick up images of an object and a dividing line which are present in a rear image pickup range (Rre) expanding on a rear side of a vehicle (V); a left rear image pickup device (11L) configured to pick up images of an object and a dividing line which are present in a left rear image pickup range (Rl) expanding on a left rear side of the vehicle and partially overlapping with the rear image pickup range; a right rear image pickup device (11R) configured to pick up images of an object and a dividing line which are present in a right rear image pickup range (Rr) expanding on a right rear side of the vehicle and partially overlapping with the rear image pickup range; a display device (12) including a display screen (12a); and an image control device (10) configured to: acquire rear image data obtained by picking up the images by the rear image pickup device, left rear image data obtained by picking up the images by the left rear image pickup device, and right rear image data obtained by picking up the images by the right rear image pickup device; generate a combined image having a panorama format based on the rear image data, the left rear image data, and the right rear image data; and display the combined image on the display screen of the display device.

When, in the rear image pickup range, the left rear image pickup range, and the right rear image pickup range, image pickup ranges to be used for generating the combined image are defined as a rear effective range (Rrea), a left rear effective range (Rla), and a right rear effective range (Rra), respectively, when, in a case in which a direction of an optical axis (Are) of the rear image pickup device is set as a rear reference direction, among boundary lines (30$la$, 30$ra$) defining a horizontal angle of view of the rear effective range, an angle from the rear reference direction of a rear left-side boundary line (30$la$) being the boundary line on a left side of the vehicle is defined as a rear left-side azimuth angle ($\theta l$) and an angle from the rear reference direction of a rear right-side boundary line (30$ra$) being the boundary line on a right side of the vehicle is defined as a rear right-side azimuth angle ($\theta r$), respectively, when, in a case in which a direction of an optical axis (Al) of the left rear image pickup device is set as a left rear reference direction, among boundary lines (40$ia$, 40$oa$) defining a horizontal angle of view of the left rear effective range, an angle from the left rear reference direction of a left rear inner-side boundary line (40*ia*) being the boundary line on an inner side in a vehicle width direction of the vehicle is defined as a left rear inner-side azimuth angle (θli), and when, in a case in which a direction of an optical axis (Ar) of the right rear image pickup device is set as a right rear reference direction, among boundary lines (50*ia*, 50*oa*) defining a horizontal angle of view of the right rear effective range, an angle from the right rear reference direction of a right rear inner-side boundary line (50*ia*) being the boundary line on an inner side in the vehicle width direction of the vehicle is defined as a right rear inner-side azimuth angle (θri), the image control device (10) is configured to: allow the rear effective range (Rrea) to be changed by changing magnitudes of the rear left-side azimuth angle (θl) and the rear right-side azimuth angle (θr) independently of each other within a range of a horizontal angle of view of the rear image pickup device; allow the left rear effective range (Rla) to be changed by changing a magnitude of the left rear inner-side azimuth angle (θli) within a range of a horizontal angle of view of the left rear image pickup device; allow the right rear effective range (Rra) to be changed by changing a magnitude of the right rear inner-side azimuth angle (θri) within a range of a horizontal angle of view of the right rear image pickup device; and calculate, based on the dividing line (d1, d2, d3, d4) detected from each of the rear image data, the left rear image data, and the right rear image data, a position and a shape of each of an own lane (L) on which the vehicle is positioned, a left lane (Ll) adjacent to the own lane on the left side thereof, and a right lane (Lr) adjacent to the own lane on the right side thereof.

When the image control device is to generate the combined image, the image control device is configured to: identify a rear target object, a left rear target object, and a right rear target object which are objects closest to the vehicle in the own lane, the left lane, and the right lane, respectively, among the objects positioned on the rear side with respect to a rear end portion of the vehicle, which are detected from the rear image data, the left rear image data, and the right rear image data; change the magnitude of the rear left-side azimuth angle (θl) based on a combination of presence or absence of the rear target object and a level of closeness to the rear target object and presence or absence of the left rear target object and a level of closeness to the left rear target object; change the magnitude of the rear right-side azimuth angle (θr) based on a combination of the presence or absence of the rear target object and the level of closeness to the rear target object and presence or absence of the right rear target object and a level of closeness to the right rear target object; change, when the magnitude of the rear left-side azimuth angle (θl) or the rear right-side azimuth angle (θr) is changed to a relatively small value, the magnitude of the left rear inner-side azimuth angle (θli) or the right rear inner-side azimuth angle (θri) to a relatively large value, respectively, so as to generate the combined image; and change, when the magnitude of the rear left-side azimuth angle or the rear right-side azimuth angle is changed to a relatively large value, the magnitude of the left rear inner-side azimuth angle or the right rear inner-side azimuth angle to a relatively small value, respectively, so as to generate the combined image.

In the present system, when the combined image is to be generated, the magnitude of the rear left-side azimuth angle (angle from the rear reference direction of the boundary line on the left side of the vehicle (rear left-side boundary line) among the boundary lines defining the horizontal angle of view of the rear effective range) is changed based on the combination of the presence or absence of the rear target object (object closest to the vehicle in the own lane) and the level of closeness to the rear target object (for example, any of "close," "intermediate," or "far") and the presence or absence of the left rear target object (object closest to the vehicle in the left lane) and the level of closeness to the left rear target object. In addition, when the magnitude of the rear left-side azimuth angle is changed, the magnitude of the left rear inner-side azimuth angle (angle from the left rear reference direction of the boundary line on the inner side in the vehicle width direction (left rear inner-side boundary line) among the boundary lines defining the horizontal angle of view of the left rear effective range) is changed in accordance with this change. When each of the magnitude of the rear left-side azimuth angle and the magnitude of the left rear inner-side azimuth angle is appropriately changed based on the above-mentioned combination, the rear target object and the left rear target object (when only one of the target objects is detected, the detected object) can be appropriately displayed in the combined image.

Similarly, in the present system, when the combined image is to be generated, the magnitude of the rear right-side azimuth angle (angle from the rear reference direction of the boundary line on the right side of the vehicle (rear right-side boundary line) among the boundary lines defining the horizontal angle of view of the rear effective range) is changed based on the combination of the presence or absence of the rear target object and the level of closeness to the rear target object and the presence or absence of the right rear target object (object closest to the vehicle in the right lane) and the level of closeness to the right rear target object. In addition, when the magnitude of the rear right-side azimuth angle is changed, the magnitude of the right rear inner-side azimuth angle (angle from the right rear reference direction of the boundary line on the inner side in the vehicle width direction (right rear inner-side boundary line) among the boundary lines defining the horizontal angle of view of the right rear effective range) is changed in accordance with this change. When each of the magnitude of the rear right-side azimuth angle and the magnitude of the right rear inner-side azimuth angle is appropriately changed based on the above-mentioned combination, the rear target object and the right rear target object (when only one of the target objects is detected, the detected object) can be appropriately displayed in the combined image.

In this case, among the objects positioned on the rear side of the vehicle, object having a relatively high possibility of affecting the traveling of the vehicle is an object closest to the vehicle in each of the own lane, the left lane, and the right lane (that is, the rear target object, the left rear target object, and the right rear target object). Accordingly, with the configuration of the present system, the object having a relatively high possibility of affecting the traveling of the vehicle can be appropriately displayed in the combined image.

In addition, the changes of the rear left-side azimuth angle and the left rear inner-side azimuth angle and the changes of the rear right-side azimuth angle and the right rear inner-side azimuth angle are performed based on only information on the rear target object, the left rear target object, and the right rear target object (that is, the presence or absence of those target objects and the level of closeness to those target objects), and information on other objects is not considered. Thus, an increase of a processing load applied when the combined image is generated can be suppressed.

According to one aspect of the present disclosure, the image control device (10) is configured to: allow the rear left-side azimuth angle (θl) to be changed between a first rear left-side angle (θn) and a second rear left-side angle (θw) having a magnitude larger than a magnitude of the first rear left-side angle; allow the rear right-side azimuth angle (θr) to be changed between a first rear right-side angle (−θn) and a second rear right-side angle (−θw) having a magnitude larger than a magnitude of the first rear right-side angle; allow the left rear inner-side azimuth angle (θli) to be changed between a first left rear inner-side angle (−θ1) and a second left rear inner-side angle (−θ2) having a magnitude larger than a magnitude of the first left rear inner-side angle; and allow the right rear inner-side azimuth angle (θri) to be changed between a first right rear inner-side angle (θ1) and a second right rear inner-side angle (θ2) having a magnitude larger than a magnitude of the first right rear inner-side angle.

With this configuration, with a relatively simple configuration, the rear target object, the left rear target object, and the right rear target object can be appropriately displayed in the combined image.

According to one aspect of the present disclosure, the image control device (10) is configured to: set an imaginary projection surface (Sp) orthogonal to a tread surface of the vehicle (V) at a position separated away from the rear end portion of the vehicle rearward by a predetermined projection distance (D3) determined as a fixed value; and generate, as the combined image, an image obtained by projecting, onto the imaginary projection surface, the object and the dividing line present in each of the rear effective range (Rrea), the left rear effective range (Rla), and the right rear effective range (Rra) through use of a viewpoint (Pv) as a reference, the viewpoint (Pv) being imaginarily set on the vehicle or in vicinity thereof, and, when the image control device is to generate the combined image, the image control device is configured to change each of the rear left-side azimuth angle (θl), the left rear inner-side azimuth angle (θli), the rear right-side azimuth angle (θr), and the right rear inner-side azimuth angle (θri) so that a left-side intersection (Pl) and a right-side intersection (Pr) are positioned on the imaginary projection surface in plan view of the vehicle, the left-side intersection (Pl) being an intersection between the rear left-side boundary line (30*la*) and the left rear inner-side boundary line (40*ia*), the right-side intersection (Pr) being an intersection between the rear right-side boundary line (30*ra*) and the right rear inner-side boundary line (50*ia*).

According to the one aspect of the present disclosure, the left-side intersection (intersection between the rear left-side boundary line and the left rear inner-side boundary line) is positioned on the projection surface in plan view of the vehicle. Accordingly, an overlapping part (overlapping region) between the rear effective range and the left rear effective range can be suppressed to be as small as possible, and a range in which the object and/or the dividing line is displayed doubly in the combined image can be reduced to be as small as possible. Similarly, in the present system, the right-side intersection (intersection between the rear right-side boundary line and the right rear inner-side boundary line) is positioned on the projection surface in plan view of the vehicle. Accordingly, an overlapping part (overlapping region) between the rear effective range and the right rear effective range can be suppressed to be as small as possible, and a range in which the object and/or the dividing line is displayed doubly in the combined image can be reduced to be as small as possible. In the following, a phenomenon in which the object and/or the dividing line is displayed doubly in the combined image is also referred to as "doubling phenomenon."

The left-side intersection is positioned at a seam between the rear image data and the left rear image data (strictly speaking, between the image data corresponding to the rear effective range in the rear image data and the image data corresponding to the left rear effective range in the left rear image data) in the combined image. Similarly, the right-side intersection is positioned at a seam between the rear image data and the right rear image data (strictly speaking, between the image data corresponding to the rear effective range in the rear image data and the image data corresponding to the right rear effective range in the right rear image data) in the combined image.

In this case, when a region between a first straight line (21) passing through the rear end portion of the vehicle (V) and extending in the vehicle width direction of the vehicle and a second straight line (22) separated away from the first straight line rearward by a predetermined first distance (D1) and in parallel to the first straight line is defined as a first zone (Z1), a region between the second straight line and a third straight line (23) separated away from the first straight line rearward by a predetermined second distance (D2) and in parallel to the first straight line is defined as a second zone (Z2), and a region on the rear side with respect to the third straight line (23) is defined as a third zone (Z3), the predetermined projection distance (D3) is longer than the predetermined first distance and is shorter than the predetermined second distance, and when an intersection between the imaginary projection surface (Sp) and a left imaginary line extending rearward from a left rear corner portion (C1) of the vehicle so as to be parallel to a longitudinal axis (A) of the vehicle is defined as a first intersection (P11), and an intersection between the imaginary projection surface (Sp) and a right imaginary line extending rearward from a right rear corner portion (Cr) of the vehicle so as to be parallel to the longitudinal axis (A) of the vehicle is defined as a second intersection (P12), in a case in which the magnitude of the rear left-side azimuth angle (θl) or the rear right-side azimuth angle (θr) is changed to the relatively small value, in plan view of the vehicle, the left-side intersection (Pl) or the right-side intersection (Pr) is positioned on the first intersection or in vicinity thereof, or on the second intersection or in vicinity thereof, respectively, and in a case in which the magnitude of the rear left-side azimuth angle or the rear right-side azimuth angle is changed to the relatively large value, the left-side intersection or the right-side intersection is positioned at a position separated away from the first intersection or the second intersection outward in the vehicle width direction of the vehicle, respectively, by a predetermined distance equal to or larger than a general lane width.

With this configuration, no matter what combination the above-mentioned combination of the rear target object and the left rear target object (or the right rear target object) may be, the rear target object, the left rear target object, and the right rear target object can be appropriately displayed in the combined image.

In this case, the predetermined projection distance (D3) is smaller than ½ of a sum of the predetermined first distance (D1) and the predetermined second distance (D2).

With this configuration, no matter what combination the above-mentioned combination of the rear target object and the left rear target object (or the right rear target object) may be, the rear target object, the left rear target object, and the right rear target object can be more appropriately displayed in the combined image.

According to one aspect of the present disclosure, the image control device (10) is configured to: change the magnitude of the rear left-side azimuth angle (θl) to the relatively large value when the rear target object is positioned in the first zone (Z1) and the left rear target object is positioned on the rear side with respect to the first zone; and change the magnitude of the rear right-side azimuth angle (θr) to the relatively large value when the rear target object is positioned in the first zone and the right rear target object is positioned on the rear side with respect to the first zone.

In a related-art image control system, there is a possibility that the left rear target object (or the right rear target object) is hidden behind the rear target object depending on the positional relationship between the rear target object and the left rear target object (or the right rear target object) and that the left rear target object (or the right rear target object) is not displayed in the combined image (in the following, this phenomenon is also referred to as "hiding phenomenon"). Meanwhile, when the magnitude of the rear left-side azimuth angle (or the rear right-side azimuth angle) is changed to the relatively small value, there is a possibility that a part of the rear target object (typically, a front corner portion thereof) is cut off from the combined image (in the following, this phenomenon is also referred to as "cut-off phenomenon"). That is, there is a possibility that a turn signal lamp of the rear target object is not displayed in the combined image, and, as a result, a driver of the vehicle cannot determine from the combined image whether or not the rear target object has an intention to change the lane. When the vehicle changes the lane without noticing the intention to change the lane in spite of the rear target object having the intention, there is a possibility that the rear target object comes excessively close to or comes into contact with the vehicle, and hence the traveling safety of the vehicle is reduced.

In view of the above, according to the one aspect of the present disclosure, when the rear target object is positioned in the first zone and the left rear target object (or the right rear target object) is positioned on the rear side with respect to the first zone, the magnitude of the rear left-side azimuth angle (or the rear right-side azimuth angle) is changed to the relatively large value. That is, priority is given more to solving the cut-off phenomenon of the rear target object than to solving the hiding phenomenon of the left rear target object (or the right rear target object). With this configuration, at least the rear target object can be appropriately displayed in the combined image, and hence reduction of the traveling safety of the vehicle can be suppressed.

According to one aspect of the present disclosure, the image control device (10) is configured to: change the magnitude of the rear left-side azimuth angle (θl) to the relatively large value when the rear target object is positioned in the first zone (Z1) and the left rear target object is absent; and change the magnitude of the rear right-side azimuth angle (θr) to the relatively large value when the rear target object is positioned in the first zone and the right rear target object is absent.

When the magnitude of the rear left-side azimuth angle (or the rear right-side azimuth angle) is changed to the relatively small value, the cut-off phenomenon occurs in the rear target object, and, in some cases, the vehicle may change the lane while the driver of the vehicle does not notice that the rear target object has an intention to change the lane. In this case, there is a possibility that the rear target object comes excessively close to or comes into contact with the vehicle, and hence the traveling safety of the vehicle is reduced. In view of the above, according to the one aspect of the present disclosure, when the rear target object is positioned in the first zone and the left rear target object (or the right rear target object) is absent, the magnitude of the rear left-side azimuth angle (or the rear right-side azimuth angle) is changed to the relatively large value. With this configuration, the rear target object can be appropriately displayed in the combined image, and hence reduction of the traveling safety of the vehicle can be suppressed.

According to one aspect of the present disclosure, the image control device (10) is configured to: change the magnitude of the rear left-side azimuth angle (θl) to the relatively small value when both of the rear target object and the left rear target object are positioned in the first zone (Z1); and change the magnitude of the rear right-side azimuth angle (θr) to the relatively small value when both of the rear target object and the right rear target object are positioned in the first zone.

When the magnitude of the rear left-side azimuth angle (or the rear right-side azimuth angle) is changed to the relatively small value, the left rear target object (or the right rear target object) may be appropriately displayed in the combined image, but the cut-off phenomenon may occur in the rear target object, and in some cases, the vehicle may change the lane while the driver of the vehicle does not notice that the rear target object has an intention to change the lane. In this case, there is a possibility that the rear target object comes excessively close to or comes into contact with the vehicle, and hence the traveling safety of the vehicle is reduced. Meanwhile, when the magnitude of the rear left-side azimuth angle (or the rear right-side azimuth angle) is changed to the relatively large value, the cut-off phenomenon of the rear target object is solved, but there is a possibility that the left rear target object (or the right rear target object) is not displayed in the combined image (disappears in the combined image) because the left rear target object (or the right rear target object) is positioned in a blind spot region between the rear effective range and the left rear effective range (or the right rear effective range) (in the following, this phenomenon is also referred to as "disappearing phenomenon"). When the vehicle changes the lane while the driver does not notice the presence of the left rear target object (or the right rear target object) due to the disappearing phenomenon, there is a possibility that the left rear target object (or the right rear target object) traveling straight comes into contact with the vehicle, and hence the traveling safety of the vehicle is reduced.

In this case, even when the cut-off phenomenon occurs in the rear target object, a part of the rear target object is displayed in the combined image, and hence the driver can recognize the presence of the rear target object itself. In contrast, when the disappearing phenomenon occurs in the left rear target object (or the right rear target object), this target object is not displayed at all in the combined image, and hence the driver cannot recognize the presence of this target object. In view of the above, according to the one aspect of the present disclosure, when both of the rear target object and the left rear target object (or the right rear target object) are positioned in the first zone, the magnitude of the rear left-side azimuth angle (or the rear right-side azimuth angle) is changed to the relatively small value. That is, priority is given more to solving the disappearing phenomenon of the left rear target object (or the right rear target object) than to solving the cut-off phenomenon of the rear target object. With this configuration, the left rear target object (or the right rear target object) can be appropriately displayed in the combined image, and hence reduction of the traveling safety of the vehicle can be suppressed.

According to one aspect of the present disclosure, the image control device (10) is configured to: change the magnitude of the rear left-side azimuth angle (θl) to the relatively large value when both of the rear target object and the left rear target object are positioned in the third zone (Z3); change the magnitude of the rear right-side azimuth angle (θr) to the relatively large value when both of the rear target object and the right rear target object are positioned in the third zone; change the magnitude of the rear left-side azimuth angle (θl) to the relatively large value when the rear target object is absent and the left rear target object is positioned in the third zone; and change the magnitude of the rear right-side azimuth angle (θr) to the relatively large value when the rear target object is absent and the right rear target object is positioned in the third zone.

With this configuration, no doubling phenomenon occurs in the left rear target object (or the right rear target object), and hence the appearance of the combined image is improved.

According to one aspect of the present disclosure, when the image control device (10) is to generate the combined image, the image control device (10) is configured to: change the rear left-side azimuth angle (θl) and the left rear inner-side azimuth angle (θli) continuously when changing the rear left-side azimuth angle (θl) and the left rear inner-side azimuth angle (θli); and change the rear right-side azimuth angle (θr) and the right rear inner-side azimuth angle (θri) continuously when changing the rear right-side azimuth angle (θr) and the right rear inner-side azimuth angle (θri).

With this configuration, movement of a seam of the combined image becomes smoother, and hence switching of the combined image can be performed smoothly.

In the description above, in order to facilitate understanding of the disclosure, reference symbols used in at least one embodiment of the present disclosure are enclosed in parentheses, and are assigned to each of constituent features of the disclosure corresponding to the at least one embodiment. However, each of the constituent features of the disclosure is not limited to the at least one embodiment prescribed by the reference symbols.

BRIEF DESCRIPTION OF THE DRAWINGS

FIG. 6A is a matrix M1 to be used for determination of the azimuth angle θl.

FIG. 14A is a matrix M3 serving as a modification example to be used for determination of the azimuth angle θl.

FIG. 14B is a matrix M4 serving as another modification example to be used for determination of the azimuth angle θr.

DESCRIPTION OF THE EMBODIMENTS (Configuration)

Figure 1:
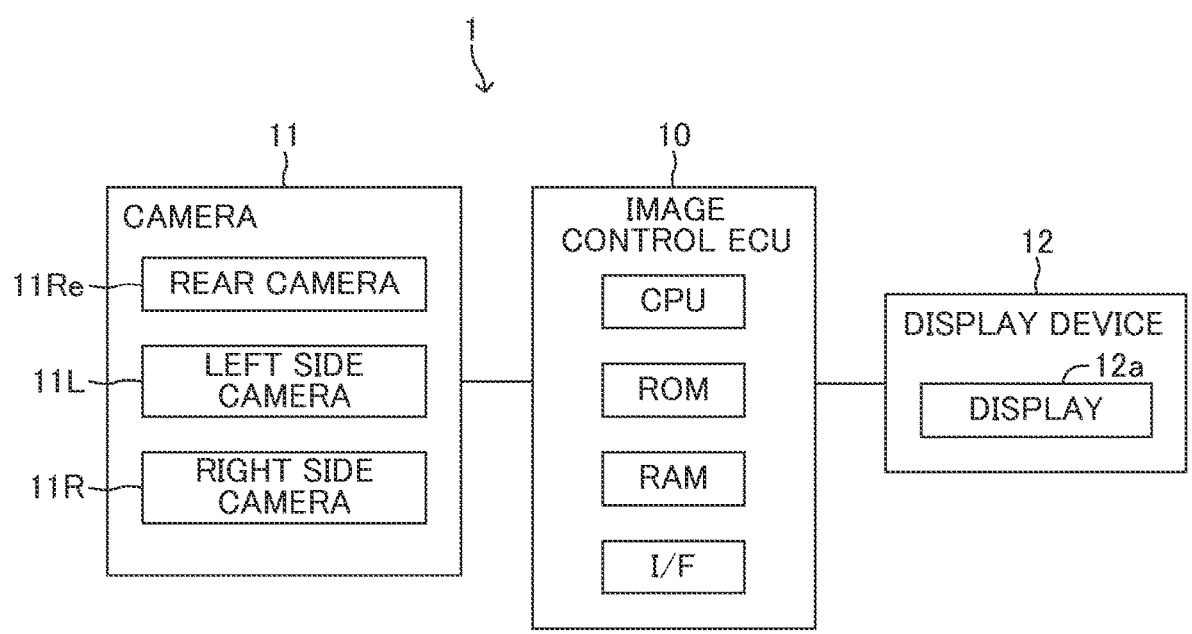
FIG. 1 is a schematic configuration diagram of an image control system according to at least one embodiment of the present disclosure.

FIG. 1 is a schematic configuration diagram of an image control system 1 according to at least one embodiment of the present disclosure. As illustrated in FIG. 1, the image control system 1 includes an image control ECU 10 serving as an image control device, a camera 11, and a display device 12. The camera 11 and the display device 12 are connected to the image control ECU 10. The image control ECU 10 includes a microcomputer as a main unit. The ECU is an abbreviation for electronic control unit. The microcomputer includes a CPU, a ROM, a RAM, an interface (I/F), and the like, and the CPU implements various functions by executing instructions (programs or routines) stored in the ROM. In the following, a vehicle having the image control system 1 mounted thereon is referred to as "own vehicle." Further, the image control ECU 10 is also simply referred to as "ECU 10."

Figure 2:
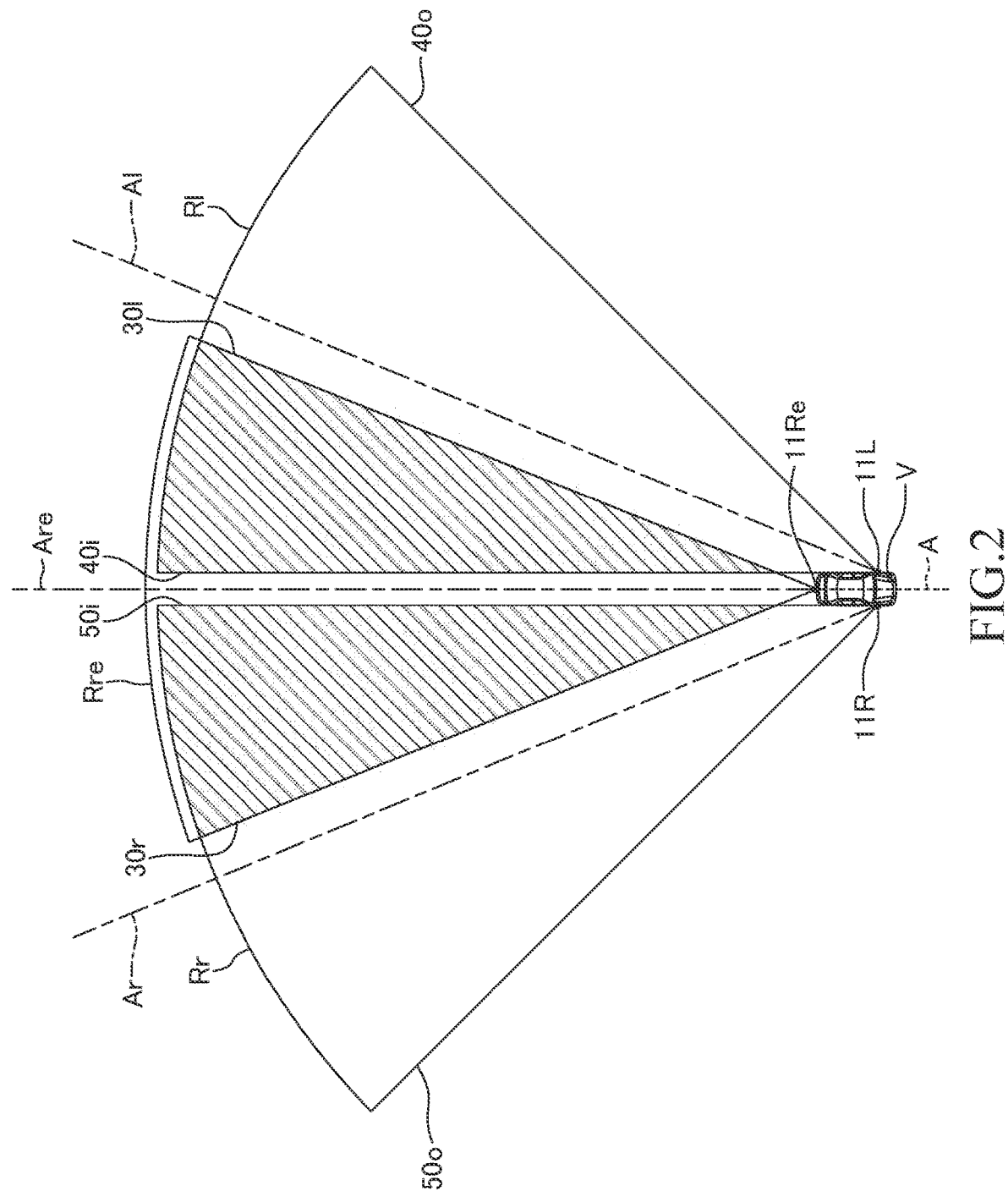
FIG. 2 is a plan view for illustrating an installation position and an image pickup range of each camera included in the image control system.

The camera 11 includes a rear camera 11Re serving as a rear image pickup device, a left side camera 11L serving as a left rear image pickup device, and a right side camera 11R serving as a right rear image pickup device. As illustrated in FIG. 2, the rear camera 11Re is installed at a rear-end center portion of an own vehicle V so that an optical axis Are thereof is substantially parallel to a tread surface of the own vehicle V. That is, the optical axis Are is parallel to a longitudinal axis A of the own vehicle V. However, an extending direction of the optical axis Are is not limited thereto. For example, the rear camera 11Re may be installed so that the optical axis Are is inclined slightly downward.

The left side camera 11L and the right side camera 11R are installed at lower portions of left and right side mirrors of the own vehicle V, respectively, so that optical axes Al and Ar thereof are substantially parallel to the tread surface of the own vehicle V. However, extending directions of the optical axes Al and Ar are not limited thereto. For example, the left side camera 11L and the right side camera 11R may be installed so that the optical axes Al and Ar are each inclined slightly downward.

In the following, the rear camera 11Re, the left side camera 11L, and the right side camera 11R are also referred to as "camera 11Re, camera 11L, and camera 11R," respectively. Installation positions of the cameras 11L and 11R are not limited to the above-mentioned positions. For example, the cameras 11L and 11R may be built into the left and right side mirrors, respectively.

The camera 11Re picks up an image of a landscape on a rear side (strictly speaking, on a directly rear side and diagonally rearward left and right sides) of the own vehicle V. A range Rre shows a plan view of an image pickup range (rear image pickup range expanding on the rear side of the own vehicle V) of the camera 11Re. The image pickup range Rre has a fan shape from the position of the camera 11Re serving as a center, and is line-symmetric with respect to the longitudinal axis A. A horizontal angle of view and a vertical angle of view of the camera 11Re are set in advance to such values that an object (typically, another vehicle or a two-wheeled motor vehicle) and a dividing line positioned on the rear side of the own vehicle V may be included in the image pickup range Rre. In the at least one embodiment, the horizontal angle of view of the camera 11Re is set to 44 degrees, but the horizontal angle of view is not particularly limited. A boundary line 30*l* and a boundary line 30*r* are a boundary line on the left side of the own vehicle V and a boundary line on the right side of the own vehicle V, respectively, among boundary lines defining the horizontal angle of view of the camera 11Re. In the following, the boundary lines 30*l* and 30*r* are also simply referred to as "boundary lines 30*l* and 30*r* of the image pickup range Rre." The camera 11Re picks up an image of a subject (typically, an object and a dividing line) present in the image pickup range Rre, and outputs the obtained image data to the ECU 10 as rear image data.

The camera 11L picks up an image of a landscape on a left rear side (strictly speaking, on left rear and lateral side) of the own vehicle V. A range Rl shows a plan view of an image pickup range (left rear side image pickup range expanding on the left rear side of the own vehicle V) of the camera 11L. The image pickup range Rl has a fan shape from the position of the camera 11L serving as a center. A horizontal angle of view and a vertical angle of view of the camera 11L are set in advance to such values that an object and a dividing line positioned on the left rear side of the own vehicle V may be included in the image pickup range Rl. In the at least one embodiment, the horizontal angle of view of the camera 11L is set to 45 degrees, but the horizontal angle of view is not particularly limited. A boundary line 40*i* and a boundary line 40*o* are a boundary line on an inner side in a vehicle width direction of the own vehicle V and a boundary line on an outer side in the vehicle width direction of the own vehicle V, respectively, among boundary lines defining the horizontal angle of view of the camera 11L. In the following, the boundary lines 40*i* and 40*o* are also simply referred to as "boundary lines 40*i* and 40*o* of the image pickup range Rl." The boundary line 40*i* is parallel to the longitudinal axis A, but an extending direction of the boundary line 40*i* is not limited thereto. The image pickup range Rl partially overlaps with the image pickup range Rre (see the shaded part). The camera 11L picks up an image of a subject positioned in the image pickup range Rl, and outputs the obtained image data to the ECU 10 as left rear image data.

The camera 11R picks up an image of a landscape on a right rear side (strictly speaking, on a right rear and lateral side) of the own vehicle V. A range Rr shows a plan view of an image pickup range (right rear side image pickup range expanding on the right rear side of the own vehicle V) of the camera 11R. The image pickup range Rr has a fan shape from the position of the camera 11R serving as a center. A horizontal angle of view and a vertical angle of view of the camera 11R are set in advance to such values that an object and a dividing line positioned on the right rear side of the own vehicle V may be included in the image pickup range Rr. In the at least one embodiment, the horizontal angle of view of the camera 11R is set to 45 degrees, but the horizontal angle of view is not particularly limited. A boundary line 50*i* and a boundary line 50*o* are a boundary line on the inner side in the vehicle width direction of the own vehicle V and a boundary line on the outer side in the vehicle width direction of the own vehicle V, respectively, among boundary lines defining the horizontal angle of view of the camera 11R. In the following, the boundary lines 50*i* and 50*o* are also simply referred to as "boundary lines 50*i* and 50*o* of the image pickup range Rr." The boundary line 50*i* is parallel to the longitudinal axis A, but an extending direction of the boundary line 50*i* is not limited thereto. The image pickup range Rr partially overlaps with the image pickup range Rre (see the shaded part). The camera 11R picks up an image of a subject positioned in the image pickup range Rr, and outputs the obtained image data to the ECU 10 as right rear image data.

In FIG. 2, for ease of viewing of the drawings, the own vehicle V and each of the image pickup ranges Rre, Rl, and Rr are drawn in scales different from each other.

The description is continued referring back to FIG. 1. The display device 12 includes a display 12*a* (display screen) provided at a position viewable by a driver. The display device 12 may be, for example, an inner mirror (rear-view mirror), or a display device including a navigation system. In the former case, a mirror part of the inner mirror is used as the display 12*a*, and in the latter case, a touch panel is used as the display 12*a*.

The ECU 10 acquires each of the rear image data, the left rear image data, and the right rear image data output from the cameras 11Re, 11L, and 11R, respectively, every time a predetermined time period T elapses. Then, the ECU 10 generates a panorama-format combined image (details are described later) based on those acquired pieces of image data, and displays the combined image on the display 12*a* of the display device 12.

(Details of Operation)

Next, details of the operation of the ECU 10 are described. The CPU of the ECU 10 is configured to repeatedly execute, during a period in which an ignition switch is turned on, a routine illustrated in a flow chart of FIG. 3 every time the predetermined time period T elapses.

Figure 3:
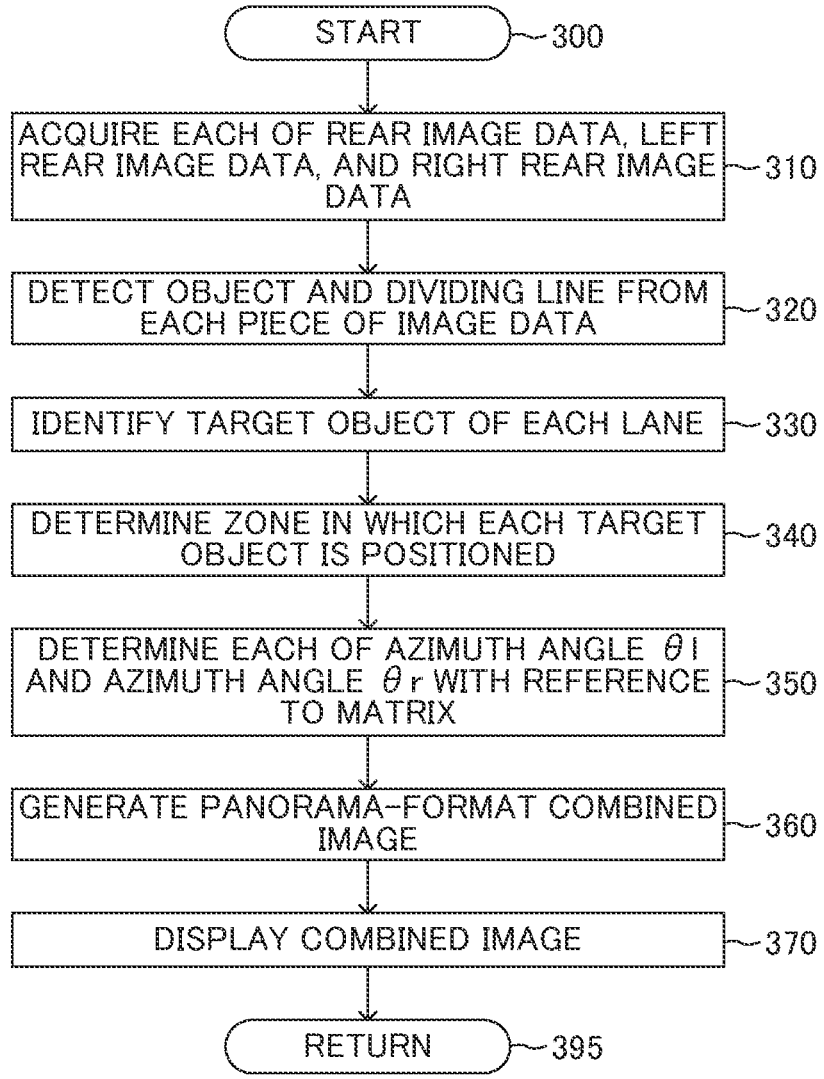
FIG. 3 is a flow chart for illustrating a routine to be executed by a CPU of an image control ECU included in the image control system.

When a predetermined timing arrives, the CPU starts the processing from Step 300 of FIG. 3, and sequentially executes process steps of from Step 310 to Step 370.

In Step 310, the CPU acquires each of the rear image data, the left rear image data, and the right rear image data output from the cameras 11Re, 11L, and 11R, respectively.

In Step 320, the CPU analyzes each piece of image data acquired in Step 310 to detect an object, and calculates a relative relationship between the own vehicle V and the object. In this case, the "relative relationship between the own vehicle V and the object" includes a distance from the own vehicle V to the object, a direction and a relative speed of the object with respect to the own vehicle V, and the like.

Strictly speaking, the "distance from the own vehicle V to the object" means a distance (shortest distance) from any reference position (typically, rear-end center portion) of the rear end portion of the own vehicle V to the object. That is, the CPU calculates a distance to the object detected from each piece of image data (in other words, a distance to the object at the time when the position of each of the cameras 11Re, 11L, and 11R is set as a reference), converts this distance into a distance from the reference position of the own vehicle V, and calculates the converted distance as the "distance from the own vehicle V to the object." Further, strictly speaking, the "direction of the object with respect to the own vehicle V" means a direction of the object with respect to the reference position of the own vehicle V. That is, the CPU calculates a direction of the object detected from each piece of image data (in other words, a direction of the object at the time when the position of each of the cameras 11Re, 11L, and 11R is set as a reference), converts this direction into a direction with respect to the reference position of the own vehicle V, and calculates the converted direction as the "direction of the object with respect to the own vehicle V." In this manner, a position (distance and direction) of the object with respect to (the reference position of) the own vehicle V may be accurately calculated.

In addition, the CPU analyzes each piece of image data so as to detect the dividing line. The dividing line is a line marked on a road in order to separate the traffic of the vehicle in each direction. The CPU calculates a position and a shape of a lane based on the detected dividing line. The lane is defined as a region between two adjacent dividing lines extending on a roadway. The camera 11Re can detect at least dividing lines forming an own lane L, a left lane Ll, and a right lane Lr. In this case, the own lane L is a lane on which the own vehicle V is positioned. The left lane Ll is a lane adjacent to the own lane L on its left side, and the right lane Lr is a lane adjacent to the own lane L on its right side. The camera 11L can detect at least dividing lines forming the left lane Ll. The camera 11R can detect at least dividing lines forming the right lane Lr.

Figure 4:
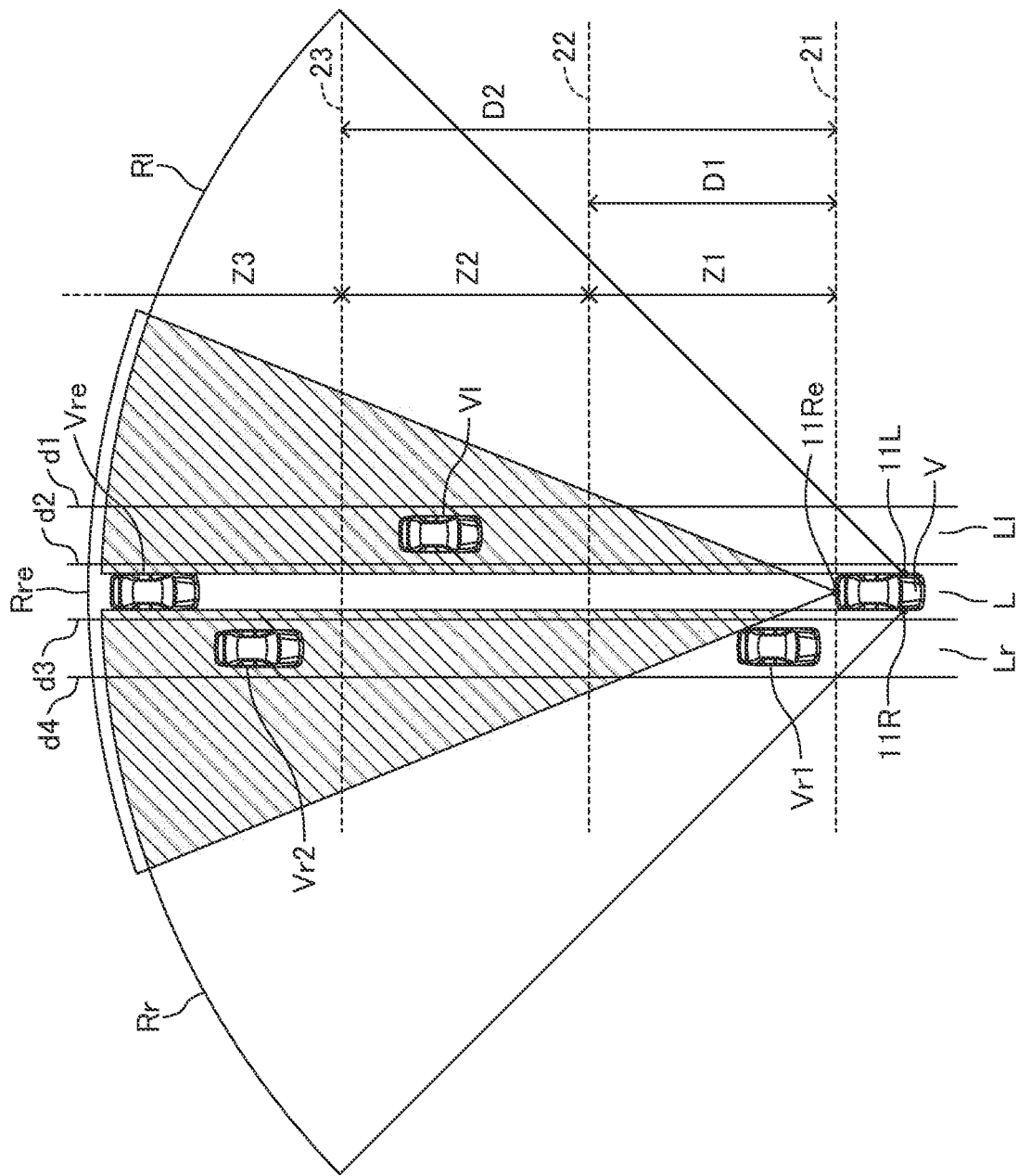
FIG. 4 is a plan view for illustrating relative positions of other vehicles with respect to an own vehicle.

In the example of FIG. 4, the image pickup range Rre includes other vehicles Vre, Vl, and Vr2 as the objects, and also includes four dividing lines d1 to d4. Accordingly, the CPU analyzes the rear image data so as to detect the other vehicles Vre, Vl, and Vr2, and calculates the relative relationship between the own vehicle V and each of the other vehicles Vre, Vl, and Vr2. In addition, the CPU analyzes the rear image data so as to detect the dividing lines d1 to d4, and calculates the position and the shape of each of the own lane L, the left lane Ll, and the right lane Lr.

The image pickup range Rl includes the another vehicle Vl as the object, and also includes the two dividing lines d1 and d2. Accordingly, the CPU analyzes the left rear image data so as to detect the another vehicle Vl, and calculates the relative relationship between the own vehicle V and the another vehicle Vl. In addition, the CPU analyzes the left rear image data so as to detect the dividing lines d1 and d2, and calculates the position and the shape of the left lane Ll. The object (in this example, the another vehicle Vl) and the dividing line (in this example, the dividing lines d1 and d2) which are positioned in an overlapping part between the image pickup range Rre and the image pickup range Rl are detected separately from each of the rear image data and the left rear image data.

The image pickup range Rr includes other vehicles Vr1 and Vr2 as the objects, and also includes the two dividing lines d3 and d4. Accordingly, the CPU analyzes the right rear image data so as to detect the other vehicles Vr1 and Vr2, and calculates the relative relationship between the own vehicle V and the other vehicles Vr1 and Vr2. In addition, the CPU analyzes the right rear image data so as to detect the dividing lines d3 and d4, and calculates the position and the shape of the right lane Lr. The object (in this example, another vehicle Vr2) and the dividing line (in this example, the dividing lines d3 and d4) which are positioned in an overlapping part between the image pickup range Rre and the image pickup range Rr are detected separately from each of the rear image data and the right rear image data.

In Step 330, the CPU determines, based on the computation results obtained in Step 320, on which lane each of the detected objects is positioned. Then, a target object of each lane (own lane L, left lane Ll, and right lane Lr) is identified. In this case, a "target object of a lane" means, among objects positioned on the rear side with respect to the rear end portion of the own vehicle V in this lane, an object having the shortest distance from the own vehicle V. The "objects positioned on the rear side with respect to the rear end portion of the own vehicle V" include an "object having at least a part positioned on the rear side with respect to the rear end portion of the own vehicle V." In the following, the description of "having the shortest distance from the own vehicle V" is also simply expressed as "closest to the own vehicle V."

Meanwhile, when the object positioned on the rear side with respect to the rear end portion of the own vehicle V is not detected on a certain lane, the CPU determines that the target object of this lane is absent.

In the example of FIG. 4, the CPU determines, based on the computation results obtained by analyzing the rear image data, that the another vehicle Vre is positioned on the own lane L, the another vehicle Vl is positioned on the left lane Ll, and the another vehicle Vr2 is positioned on the right lane Lr. Further, the CPU determines, based on the computation results obtained by analyzing the left rear image data, that the another vehicle Vl is positioned on the left lane Ll. Moreover, the CPU determines, based on the computation results obtained by analyzing the right rear image data, that both of the other vehicles Vr1 and Vr2 are positioned on the right lane Lr.

The object on the own lane L is included only in the rear image data. Accordingly, the CPU identifies, among the objects determined as being positioned on the own lane L, the object closest to the own vehicle V (in the example of FIG. 4, the another vehicle Vre) as the target object of the own lane L (rear target object).

The object on the left lane Ll may be included in both of the rear image data and the left rear image data. Accordingly, the CPU identifies, among "objects Ol(re) determined as being positioned on the left lane Ll based on the rear image data (in the example of FIG. 4, the another vehicle Vl)" and "objects Ol(l) determined as being positioned on the left lane Ll based on the left rear image data (in the example of FIG. 4, the another vehicle Vl)," the object closest to the own vehicle V as the target object of the left lane Ll. When the distance from the own vehicle V to the object Ol(re) and the distance from the own vehicle V to the object Ol(l) are equal to each other, the CPU identifies any one of the objects (in the example of FIG. 4, for example, the another vehicle Vl detected from the rear image data) as the target object of the left lane Ll (left rear target object). The same holds true also in a case in which the target object of the right lane Lr is identified.

The object on the right lane Lr may be included in both of the rear image data and the right rear image data. Accordingly, the CPU identifies, among "objects Or(re) determined as being positioned on the right lane Lr based on the rear image data (in the example of FIG. 4, the another vehicle Vr2)" and "objects Or(r) determined as being positioned on the right lane Lr based on the right rear image data (in the example of FIG. 4, the other vehicles Vr1 and Vr2)," the object closest to the own vehicle V (in the example of FIG. 4, the another vehicle Vr1) as the target object (right rear target object) of the right lane Lr.

In Step 340, the CPU determines, based on the position of the target object of each lane identified in Step 330, a zone in which each target object is positioned. Specifically, as illustrated in FIG. 4, the CPU sets a zone Z1, a zone Z2, and a zone Z3 on the rear side of the own vehicle V. The zone Z1 is a region between a straight line 21 (first straight line) and a straight line 22 (second straight line). The straight line 21 passes through the rear end portion of the own vehicle V, and extends in a vehicle width direction (direction orthogonal to the longitudinal axis A). The straight line 22 is separated away from the straight line 21 rearward by a predetermined distance D1, and is parallel to the straight line 21. The zone Z2 is a region between the straight line 22 and a straight line 23 (third straight line). The straight line 23 is separated away from the straight line 21 rearward by a predetermined distance D2, and is parallel to the straight line 21. The zone Z3 is a region on the rear side with respect to the straight line 23. The zone Z1 is a region relatively close to the own vehicle V, and the zone Z3 is a region relatively far from the own vehicle V. The zone Z2 is an intermediate region between the zone Z1 and the zone Z3.

The distance D1 may be set in advance through experiments or simulations so that, when the own vehicle V travels at relatively middle-level vehicle speed or at high speed, the number of objects positioned in the zone Z1 is relatively small, and so that, when the own vehicle V is in a stop state or travels at relatively low speed, the number of objects positioned in the zone Z1 is relatively large. In the at least one embodiment, D1=15 m is set. The distance D2 may be set in advance through experiments or simulations so that, when the own vehicle V travels at relatively high speed, the number of objects positioned in the zone Z2 is relatively small, and so that, when the own vehicle V travels at relatively middle-level vehicle speed, the number of objects positioned in the zone Z2 is relatively large. In the at least one embodiment, D2=30 m is set. The zone Z3 is a region in which, when the own vehicle V travels at relatively high speed, the number of objects tends to be relatively large.

In the example of FIG. 4, the CPU determines that the another vehicle Vre being the target object of the own lane L is positioned in the zone Z3, determines that the another vehicle Vl being the target object of the left lane Ll is positioned in the zone Z2, and determines that the another vehicle Vr1 being the target object of the right lane Lr is positioned in the zone Z1.

In Step 350, the CPU determines each of an azimuth angle θl and an azimuth angle θr with reference to matrices M1 and M2 to be described later. In the following, the azimuth angles θl and θr are first described, and then the process step of Step 350 is specifically described.

Data ranges in the horizontal direction of the rear image data, the left rear image data, and the right rear image data correspond to the horizontal angles of view of the cameras 11Re, 11L, and 11R (in other words, the image pickup ranges Rre, Rl, and Rr), respectively. As illustrated in FIG. 2, the image pickup ranges Rre and Rl partially overlap with each other (in the horizontal direction), and the image pickup ranges Rre and Rr partially overlap with each other (in the horizontal direction). Accordingly, when those pieces of image data are directly used to generate a combined image, a range in which an object and/or a dividing line is displayed doubly is increased in the combined image, and a seam is less likely to be smooth. In view of the above, the ECU 10 performs trimming of an end portion in the horizontal direction of each of those pieces of image data as required so that the seam of the combined image becomes smoother. In the following, the image pickup range Rre corresponding to the trimmed rear image data is referred to as "effective range Rrea (rear effective range)," the image pickup range Rl corresponding to the trimmed left rear image data is referred to as "effective range Rla (left rear effective range)," and the image pickup range Rr corresponding to the trimmed right rear image data is referred to as "effective range Rra (right rear effective range)." The effective ranges Rrea, Rla, and Rra are image pickup ranges to be used for generating the combined image in the image pickup ranges Rre, Rl, and Rr, respectively.

Figure 5A:
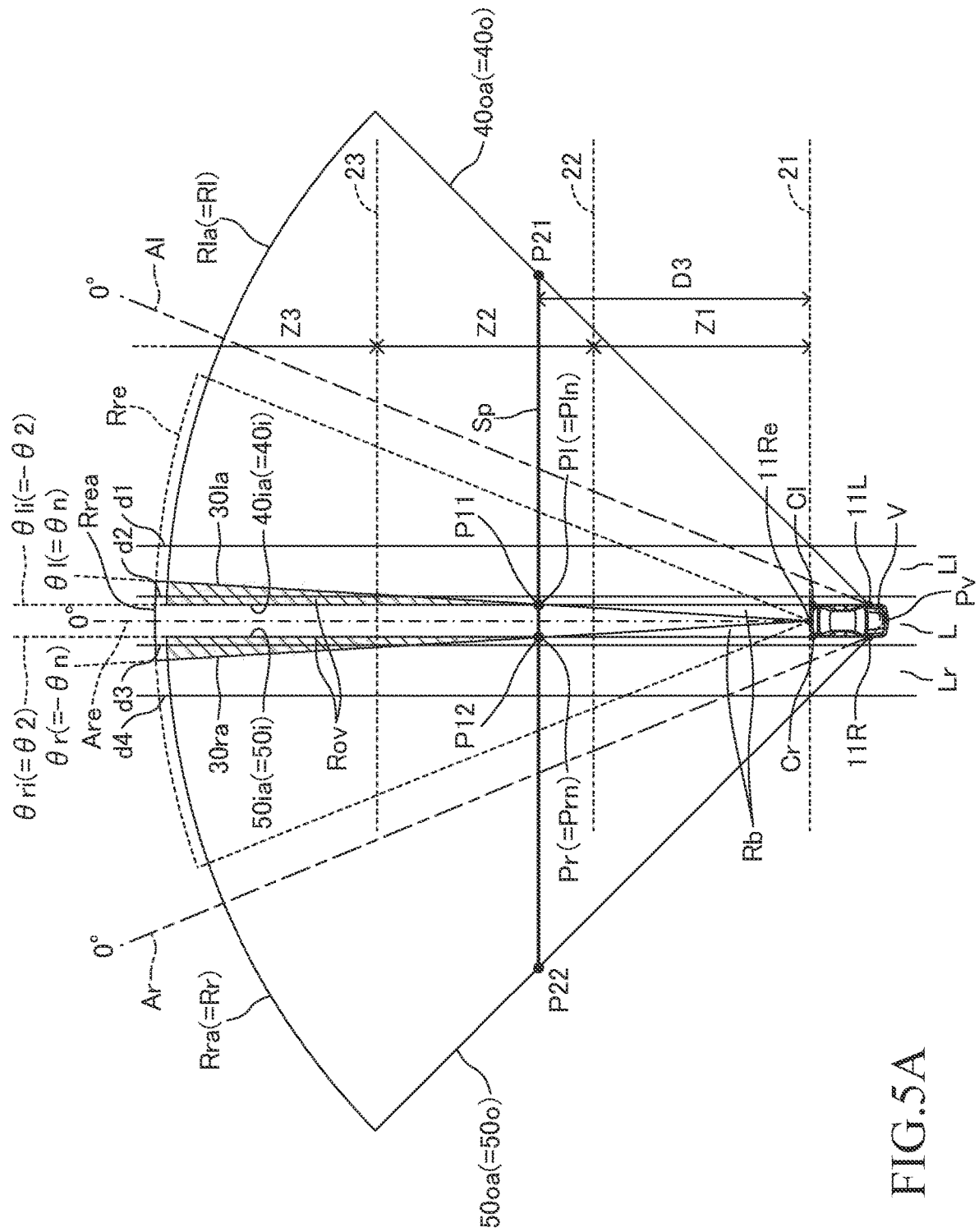
FIG. 5A is a plan view for illustrating effective ranges Rrea, Rla, and Rra and a projection surface in a case in which azimuth angles θl and θr are changed to angles θn and −θn, respectively.
Figure 5B:
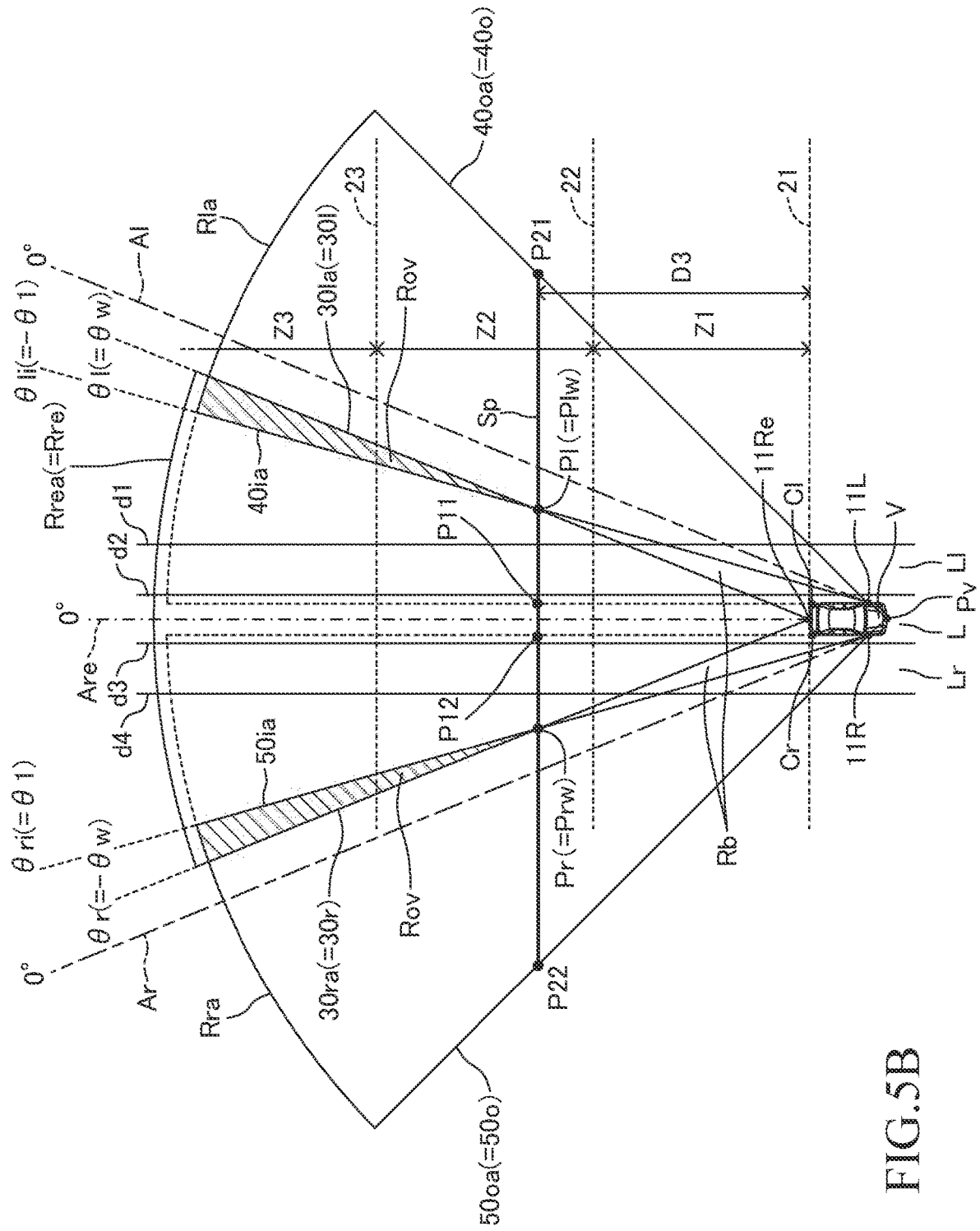
FIG. 5B is a plan view for illustrating the effective ranges Rrea, Rla, and Rra and the projection surface in a case in which the azimuth angles θl and θr are changed to angles θw and −θw, respectively.

FIG. 5A and FIG. 5B are each a view for illustrating an example of the effective ranges Rrea, Rla, and Rra. A boundary line 30la and a boundary line 30ra are, among boundary lines defining the horizontal angle of view of the effective range Rrea, a boundary line on the left side of the own vehicle V (rear left-side boundary line) and a boundary line on the right side of the own vehicle V (rear right-side boundary line), respectively. In the following, the boundary lines 30la and 30ra are also simply referred to as "boundary lines 30la and 30ra of the effective range Rrea." When a direction of the optical axis Are of the camera 11Re is set as a rear reference direction (0°), an angle of the boundary line 30la from the rear reference direction is defined as "azimuth angle θl (rear left-side azimuth angle)," and an angle of the boundary line 30ra from the rear reference direction is defined as "azimuth angle θr (rear right-side azimuth angle)." It is assumed that the azimuth angle on the left side of the own vehicle V (right side of the drawing sheet) with respect to the rear reference direction has a positive value, and the azimuth angle on the right side of the own vehicle V (left side of the drawing sheet) with respect to the rear reference direction has a negative value. The ECU 10 is configured to allow the effective range Rrea to be changed by changing the magnitudes of the azimuth angles θl and θr independently of each other within the range of the horizontal angle of view of the camera 11Re.

Specifically, the ECU 10 can change the azimuth angle θl between an angle θn (>0) (first rear left-side angle) and an angle θw (>0) (second rear left-side angle), and can change the azimuth angle θr between an angle −θn (<0) (first rear right-side angle) and an angle −θw (<0) (second rear right-side angle). The angle θw is larger than the angle θn, and the magnitude of the angle −θw is larger than the magnitude of the angle −θn. FIG. 5A shows an example of a case in which the azimuth angles θl and θr are changed to the angles θn and −θn, respectively, and FIG. 5B shows an example of a case in which the azimuth angles θl and θr are changed to the angles θw and −θw, respectively. As illustrated in FIG. 5B, when the azimuth angle θl is the angle θw, the boundary line 30la of the effective range Rrea matches the boundary line 30l of the image pickup range Rre, and when the azimuth angle θr is the angle −θw, the boundary line 30ra of the effective range Rrea matches the boundary line 30r of the image pickup range Rre. That is, the angle θw is also an azimuth angle (angle from the rear reference direction) of the boundary line 30l of the image pickup range Rre, and the angle −θw is also an azimuth angle (angle from the rear reference direction) of the boundary line 30r of the image pickup range Rre. This means that, "when the azimuth angle θl is changed to the angle θw, the trimming of the left-side end portion of the rear image data is not performed, and when the azimuth angle θr is changed to the angle −θw, the trimming of the right-side end portion of the rear image data is not performed." As is clear from the above description, all of the angles θn, −θn, θw, and −θw are angles within the range of the horizontal angle of view of the camera 11Re.

The present disclosure is not limited to the configuration in which the magnitudes of the angle θw and the angle −θw match the magnitudes of the azimuth angles of the boundary lines 30l and 30r of the image pickup range Rre, respectively, and embodiments of the present disclosure may employ a configuration in which the magnitudes of the angle θw and the angle −θw are smaller than the magnitudes of the azimuth angles of the boundary lines 30l and 30r, respectively. That is, in the case of θl=θw or θr=−θw, the boundary line 30la or 30ra of the effective range Rrea is not required to match the boundary line 30l or 30r of the image pickup range Rre.

A boundary line 40ia and a boundary line 40oa are, among boundary lines defining the horizontal angle of view of the effective range Rla, a boundary line on the inner side in the vehicle width direction of the own vehicle V (left rear inner-side boundary line) and a boundary line on the outer side in the vehicle width direction, respectively. In the following, the boundary lines 40ia and 40oa are also simply referred to as "boundary lines 40ia and 40oa of the effective range Rla." When a direction of the optical axis Al of the camera 11L is set as a left rear reference direction (0°), an angle of the boundary line 40ia from the left rear reference direction is defined as "azimuth angle θli (left rear inner-side azimuth angle)." It is assumed that the azimuth angle on the outer side in the vehicle width direction (right side of the drawing sheet) with respect to the left rear reference direction has a positive value, and the azimuth angle on the inner side in the vehicle width direction (left side of the drawing sheet) with respect to the left rear reference direction has a negative value. The ECU 10 is configured to allow the effective range Rla to be changed by changing the magnitude of the azimuth angle θli within the range of the horizontal angle of view of the camera 11L. The boundary line 40oa of the effective range Rla matches the boundary line 40o of the image pickup range Rl (see FIG. 5A and FIG. 5B). This means that "the trimming of the left-side end portion of the left rear image data is not performed." That is, the ECU 10 is configured to perform only the trimming of the right-side end portion as required when generating the combined image.

Specifically, the ECU 10 can change the azimuth angle θli between an angle −θ1 (<0) (first left rear inner-side angle) and an angle −θ2 (<0) (second left rear inner-side angle). The magnitude of the angle −θ2 is larger than the magnitude of the angle −θ1. FIG. 5A shows an example of a case in which the azimuth angle θli is changed to the angle −θ2, and FIG. 5B shows an example of a case in which the azimuth angle θli is changed to the angle −θ1. As illustrated in FIG. 5A, when the azimuth angle θli is the angle −θ2, the boundary line 40ia of the effective range Rla matches the boundary line 40i of the image pickup range Rl. That is, the angle −θ2 is also the azimuth angle (angle from the left rear reference direction) of the boundary line 40i of the image pickup range Rl. This means that, "when the azimuth angle θli is changed to the angle −θ2, the trimming of the right-side end portion of the left rear image data is not performed (that is, the effective range Rla matches the image pickup range Rl)." As is clear from the above description, both of the angles −θ1 and −θ2 are angles within the range of the horizontal angle of view of the camera 11L.

The present disclosure is not limited to the configuration in which the magnitude of the angle −θ2 matches the magnitude of the azimuth angle of the boundary line 40i of the image pickup range Rl, and embodiments of the present disclosure may employ a configuration in which the magnitude of the angle −θ2 is smaller than the magnitude of the azimuth angle of the boundary line 40i. That is, in the case of θli=−θ2, the boundary line 40ia of the effective range Rla is not required to match the boundary line 40i of the image pickup range Rl.

A boundary line 50ia and a boundary line 50oa are, among boundary lines defining the horizontal angle of view of the effective range Rra, a boundary line on the inner side in the vehicle width direction of the own vehicle V (right rear inner-side boundary line) and a boundary line on the outer side in the vehicle width direction, respectively. In the following, the boundary lines 50ia and 50oa are also simply referred to as "boundary lines 50ia and 50oa of the effective range Rra." When a direction of the optical axis Ar of the camera 11R is set as a right rear reference direction (0°), an angle of the boundary line 50ia from the right rear reference direction is defined as "azimuth angle θri (right rear inner-side azimuth angle)." It is assumed that the azimuth angle on the inner side in the vehicle width direction (right side of the drawing sheet) with respect to the right rear reference direction has a positive value, and the azimuth angle on the outer side in the vehicle width direction (left side of the drawing sheet) with respect to the right rear reference direction has a negative value. The ECU 10 is configured to allow the effective range Rra to be changed by changing the magnitude of the azimuth angle θri within the range of the horizontal angle of view of the camera 11R. The boundary line 50oa of the effective range Rra matches the boundary line 50o of the image pickup range Rr (see FIG. 5A and FIG. 5B). This means that "the trimming of the right-side end portion of the right rear image data is not performed." That is, the ECU 10 is configured to perform only the trimming of the left-side end portion as required when generating the combined image.

Specifically, the ECU 10 can change the azimuth angle θri between an angle θ1 (>0) (first right rear inner-side angle) and an angle θ2 (>0) (second right rear inner-side angle). The angle θ2 is larger than the angle θ1. FIG. 5A shows an example of a case in which the azimuth angle θri is changed to the angle θ2, and FIG. 5B shows an example of a case in which the azimuth angle θri is changed to the angle θl. As illustrated in FIG. 5A, when the azimuth angle θri is the angle θ2, the boundary line 50*ia* of the effective range Rra matches the boundary line 50*i* of the image pickup range Rr. That is, the angle θ2 is also the azimuth angle (angle from the right rear reference direction) of the boundary line 50*i* of the image pickup range Rr. This means that, "when the azimuth angle θri is changed to the angle θ2, the trimming of the left-side end portion of the right rear image data is not performed." As is clear from the above description, both of the angles θ1 and θ2 are angles within the range of the horizontal angle of view of the camera 11R.

The present disclosure is not limited to the configuration in which the angle θ2 matches the azimuth angle of the boundary lines 50*i* of the image pickup range Rr, and embodiments of the present disclosure may employ a configuration in which the angle θ2 is smaller than the azimuth angle of the boundary line 50*i*. That is, in the case of θri=θ2, the boundary line 50*ia* of the effective range Rra is not required to match the boundary line 50*i* of the image pickup range Rr.

The ECU 10 is configured to set a projection surface Sp on the rear side of the own vehicle V and set a viewpoint Pv on the own vehicle V, and to generate, as the combined image, an image obtained by projecting subjects (objects and dividing lines) present in the effective ranges Rrea, Rla, and Rra onto the projection surface Sp through use of the viewpoint Pv as a reference. In this case, the projection surface Sp is an imaginary surface set so as to be orthogonal to a road surface (tread surface of the own vehicle V) at a position separated away from the straight line 21 (in other words, from the rear end portion of the own vehicle V) rearward by a predetermined distance D3 (projection distance). In some embodiments, the projection surface Sp is set within the zone Z2. In some embodiments "D1<D3<D2" is satisfied. In more detail, In some embodiments the projection surface Sp is set in a region of the zone Z2 on a front side with respect to a center position in the direction of the longitudinal axis A. In some embodiments "D1<D3<(D1+D2)/2" be satisfied. In the at least one embodiment, D3=20 m is set (that is, D3 is a fixed value), and "D1<D3<(D1+D2)/2" is satisfied. Depending on the values of D1 and D2, the projection surface Sp may be set in another zone (zone Z1 or zone Z3).

The viewpoint Pv is set at an intersection between the extension line of the boundary line 40*oa* and the extension line of the boundary line 50*oa*. The position of the viewpoint Pv does not change due to the trimming of the left rear image data and/or the right rear image data. The position of the viewpoint Pv is not limited to a position on the own vehicle V. Depending on the extending directions of the boundary line 40*oa* and the boundary line 50*oa*, in some cases, the viewpoint Pv is positioned not on the own vehicle V but on the front side of the own vehicle V.

As described above, the distance D3 is a fixed value, and the extending directions of the boundary lines 40*oa* and 50*oa* do not change regardless of whether or not the trimming is performed. Thus, a relative position of a point P21 (intersection between the boundary line 40*oa* and the projection surface Sp in plan view of the own vehicle V) with respect to the own vehicle V and a relative position of a point P22 (intersection between the boundary line 50*oa* and the projection surface Sp in plan view of the own vehicle V) with respect to the own vehicle V do not change. In the following, the "plan view of the own vehicle V" is also simply referred to as "plan view."

As illustrated in FIG. 5A, the ECU 10 is configured to change, when changing the azimuth angle θ1 to the angle θn, the azimuth angle θli to the angle −θ2. The values of the angle θn and the angle −θ2 are set in advance so that a point Pl (left-side intersection) being an intersection between the boundary line 30*la* of the effective range Rrea and the boundary line 40*ia* of the effective range Rla is positioned on the projection surface Sp in plan view. In the at least one embodiment, the angle −θ2 is also the azimuth angle of the boundary line 40*i* of the image pickup range Rl. Accordingly, the position of the intersection between the boundary line 40*ia* (40*i*) and the projection surface Sp in plan view may be uniquely determined based on the mounting position and the performance (typically, the horizontal angle of view) of the camera 11L. The angle θn is set in advance to such a value that the boundary line 30*la* passes through the position of the intersection between the boundary line 40*ia* and the projection surface Sp determined as described above. With this configuration, in the case of the azimuth angle θ1=θn, the point Pl is positioned on the projection surface Sp in plan view. In the following, the point Pl in the case of the azimuth angle θ1=θn is also particularly referred to as "point Pln."

Similarly, the ECU 10 is configured to change, when changing the azimuth angle θr to the angle −θn, the azimuth angle θri to the angle θ2. The values of the angle −θn and the angle θ2 are set in advance so that a point Pr (right-side intersection) being an intersection between the boundary line 30*ra* of the effective range Rrea and the boundary line 50*ia* of the effective range Rra is positioned on the projection surface Sp in plan view. In the at least one embodiment, the angle θ2 is also the azimuth angle of the boundary line 50*i* of the image pickup range Rr. Accordingly, the position of the intersection between the boundary line 50*ia* (50*i*) and the projection surface Sp in plan view may be uniquely determined based on the mounting position and the performance (typically, the horizontal angle of view) of the camera 11R. The angle −θn is set in advance to such a value that the boundary line 30*ra* passes through the position of the intersection between the boundary line 50*ia* and the projection surface Sp determined as described above. With this configuration, in the case of the azimuth angle θr=−θn, the point Pr is positioned on the projection surface Sp in plan view. In the following, the point Pr in the case of the azimuth angle θr=−θn is also particularly referred to as "point Prn."

As illustrated in FIG. 5B, the ECU 10 is configured to change, when changing the azimuth angle θ1 to the angle θw, the azimuth angle θli to the angle −θ1. The values of the angle θw and the angle −θ1 are set in advance so that the point Pl is positioned on the projection surface Sp in plan view. In the at least one embodiment, the angle θw is also the azimuth angle of the boundary line 30*l* of the image pickup range Rre. Accordingly, the position of the intersection between the boundary line 30*la* (30*l*) and the projection surface Sp in plan view may be uniquely determined based on the mounting position and the performance (typically, the horizontal angle of view) of the camera 11Re. The angle −θ1 is set in advance to such a value that the boundary line 40*ia* passes through the position of the intersection between the boundary line 30*la* and the projection surface Sp determined as described above. With this configuration, in the case of the azimuth angle θ1=θw, the point Pl is positioned on the projection surface Sp in plan view. In the following, the point Pl in the case of the azimuth angle θ1=θw is also particularly referred to as "point Plw."

Similarly, the ECU 10 is configured to change, when changing the azimuth angle θr to the angle −θw, the azimuth angle θri to the angle θ1. The values of the angle −θw and the angle θl are set in advance so that the point Pr is positioned on the projection surface Sp in plan view. In the at least one embodiment, the angle −θw is also the azimuth angle of the boundary line 30r of the image pickup range Rre. Accordingly, the position of the intersection between the boundary line 30ra (30r) and the projection surface Sp in plan view may be uniquely determined based on the mounting position and the performance (typically, the horizontal angle of view) of the camera 11Re. The angle θl is set in advance to such a value that the boundary line 50ia passes through the position of the intersection between the boundary line 30ra and the projection surface Sp determined as described above. With this configuration, in the case of the azimuth angle θr=−θw, the point Pr is positioned on the projection surface Sp in plan view. In the following, the point Pr in the case of the azimuth angle θr=−θw is also particularly referred to as "point Prw."

The point Pl is positioned at a seam (left-side seam) between the trimmed rear image data and the trimmed left rear image data (in other words, between the image data corresponding to the effective range Rrea in the rear image data and the image data corresponding to the effective range Rla in the left rear image data) in the combined image. Further, the point Pr is positioned at a seam (right-side seam) between the trimmed rear image data and the trimmed right rear image data (in other words, between the image data corresponding to the effective range Rrea in the rear image data and the image data corresponding to the effective range Rra in the right rear image data) in the combined image. The ECU 10 is configured to allow the position (point Pl) of the left-side seam in the combined image to be changed between the point Pln and the point Plw by changing the azimuth angle θl between the angle θn and the angle θw. Further, the ECU 10 is configured to allow the position (point Pr) of the right-side seam in the combined image to be changed between the point Prn and the point Prw by changing the azimuth angle θr between the angle −θn and the angle −θw.

In a region between the point Pl and the point Pr in the projection surface Sp, a subject present in the effective range Rrea is projected. In a region between the point Pl and the point P21 in the projection surface Sp, a subject present in the effective range Rla is projected. In a region between the point Pr and the point P22 in the projection surface Sp, a subject present in the effective range Rra is projected.

The positions of the point Pln and the point Prn are described in more detail. As illustrated in FIG. 5A, a point P11 (first intersection) is an intersection between the projection surface Sp and a left imaginary line extending rearward from a left rear corner portion Cl of the own vehicle V so as to be parallel to the longitudinal axis A (see FIG. 2), and a point P12 (second intersection) is an intersection between the projection surface Sp and a right imaginary line extending rearward from a right rear corner portion Cr of the own vehicle V so as to be parallel to the longitudinal axis A. In the at least one embodiment, in plan view, the point Pln and the point Prn are positioned on the point P11 and the point P12, respectively. The present disclosure is not limited to the configuration in which the point Pln is positioned on the point P11, and embodiments of the present disclosure may employ a configuration in which the point Pln is positioned in the vicinity of the point P11 based on the values of the angle θn and the angle −θ2. Similarly, the present disclosure is not limited to the configuration in which the point Prn is positioned on the point P12, and embodiments of the present disclosure may employ a con-figuration in which the point Prn is positioned in the vicinity of the point P12 based on the values of the angle −θn and the angle θ2.

The positions of the point Plw and the point Prw are described in more detail. As illustrated in FIG. 5B, the point Plw is positioned at a position separated away from the point P11 outward in the vehicle width direction, and a separation distance of the point Plw is sufficiently larger than the lane width of the left lane Ll. Further, the point Prw is positioned at a position separated away from the point P12 outward in the vehicle width direction, and a separation distance of the point Prw is sufficiently larger than the lane width of the right lane Lr. The separation distance of the point Plw from the point P11 may be equal to the lane width of the left lane Ll, and the separation distance of the point Prw from the point P12 may be equal to the lane width of the right lane Lr. That is, the point Plw and the point Prw may be set so as to be positioned at positions separated away from the point P11 and the point P12, respectively, outward in the vehicle width direction by predetermined distances equal to or larger than a general lane width.

It is here assumed that, when each of the lanes L, Ll, and Lr has a straight line shape, the own vehicle V travels along the extending direction of the own lane L (the longitudinal axis A is parallel to the extending direction). In this case, the point Pln is positioned slightly on the inner side in the vehicle width direction with respect to the dividing line d2 (left-side dividing line forming the own lane L), and the point Prn is positioned slightly on the inner side in the vehicle width direction with respect to the dividing line d3 (right-side dividing line forming the own lane L) (see FIG. 5A). Further, the point Plw is positioned on the outer side in the vehicle width direction with respect to the dividing line d1 (left-side dividing line forming the left lane Ll), and the point Prw is positioned on the outer side in the vehicle width direction with respect to the dividing line d4 (right-side dividing line forming the right lane Lr) (see FIG. 5B). Moreover, the projection surface Sp on which the point Pl (Pln or Plw) and the point Pr (Prn or Prw) are positioned is positioned in the zone Z2, and "D1<D3<(D1+D2)/2" is satisfied.

At this time, a position of each of the zones Z1 to Z3 at which a blind spot region Rb and/or an overlapping region Rov (both regions are described later) is formed has a feature corresponding to the value of θl (or |θr|) (that is, θn or θw). Now, the feature is specifically described. The blind spot region Rb is a region between the effective ranges Rrea and Rla and a region between the effective ranges Rrea and Rra. A subject present in the blind spot region Rb is not displayed in the combined image. The overlapping region Rov is a region in which the effective ranges Rrea and Rla partially overlap with each other and a region in which the effective ranges Rrea and Rra partially overlap with each other. A subject present in the overlapping region Rov is displayed doubly in the combined image. In the at least one embodiment, the point Pl and the point Pr are positioned on the projection surface Sp. Accordingly, the blind spot region Rb is formed on the front side of the projection surface Sp (in other words, on the front side of the point Pl and the point Pr), and the overlapping region Rov is formed on the rear side of the projection surface Sp (in other words, on the rear side of the point Pl and the point Pr) (see FIG. 5A and FIG. 5B).

First, the case of θl=θn or θr=−θn is described with reference to FIG. 5A. The words in the parentheses are features in the case of θr=−θn. In the zone Z1, the following features are obtained.

(Feature 1n) The blind spot region Rb is formed in a part of the own lane L excluding a center portion and a left end portion (right end portion) thereof.
(Feature 2n) No blind spot region Rb is formed in the left lane Ll (right lane Lr).
(Feature 3n) No overlapping region Rov is formed in the own lane L and the left lane Ll (right lane Lr).

In the zone Z2, the following features are obtained.
(Feature 4n) The blind spot region Rb is slightly formed in a part of the own lane L on the front side of the point Pln (point Prn) excluding the center portion and the left end portion (right end portion) thereof.
(Feature 5n) No blind spot region Rb is formed in the left lane Ll (right lane Lr).
(Feature 6n) The overlapping region Rov is slightly formed at the left end portion (right end portion) of the own lane L on the rear side of the point Pln (point Prn).
(Feature 7n) Almost no overlapping region Rov is formed in the left lane Ll (right lane Lr).

In the zone Z3, the following features are obtained.
(Feature 8n) No blind spot region Rb is formed in the own lane L and the left lane Ll (right lane Lr).
(Feature 9n) The overlapping region Rov is slightly formed at the left end portion (right end portion) of the own lane L.
(Feature 10n) The overlapping region Rov is formed at the right end portion (left end portion) of the left lane Ll (right lane Lr), and its range is increased as the overlapping region Rov expands toward the rear side.

Next, the case of $\theta l = \theta w$ or $\theta r = -\theta w$ is described with reference to FIG. 5B. In the zone Z1, the following features are obtained.
(Feature 1w) The blind spot region Rb is slightly formed on the left side (right side) of the front part of the own lane L.
(Feature 2w) The blind spot region Rb is formed so as to cross the left lane Ll (right lane Lr) in a diagonally rearward left direction.
(Feature 3w) No overlapping region Rov is formed in the own lane L and the left lane Ll (right lane Lr).

In the zone Z2, the following features are obtained.
(Feature 4w) No blind spot region Rb is formed in the own lane L.
(Feature 5w) No blind spot region Rb is formed in the left lane Ll (right lane Lr).
(Feature 6w) No overlapping region Rov is formed in the own lane L.
(Feature 7w) No overlapping region Rov is formed in the left lane Ll (right lane Lr).

In the zone Z3, the following features are obtained.
(Feature 8w) No blind spot region Rb is formed in the own lane L and the left lane Ll (right lane Lr).
(Feature 9w) No overlapping region Rov is formed in the own lane L.
(Feature 10w) No overlapping region Rov is formed in the left lane Ll (right lane Lr).

Next, the process step of Step 350 is specifically described. The CPU determines (changes or maintains), through use of the determination results of Step 340, the azimuth angle $\theta l$ based on a combination of "presence or absence of a target object of the own lane L and a zone in which this target object is positioned" and "presence or absence of a target object of the left lane Ll and a zone in which this target object is positioned." FIG. 6A shows the matrix M1 representing this combination. Regarding the target object of the own lane L, "Z1 (close)," "Z2 (intermediate)," "Z3 (far)," and "absent" in the matrix M1 represent that this target object is "positioned in the zone Z1," this target object is "positioned in the zone Z2," this target object is "positioned in the zone Z3," and "the target object is absent," respectively. The same holds true also for the target object of the left lane Ll. Further, the same holds true also for the target objects of the own lane L and the right lane Lr in the matrix M2 to be described later. In addition, "narrow" and "wide" in the matrix M1 mean that the azimuth angle $\theta l$ is "changed to the angle $\theta n$" and the azimuth angle $\theta l$ is "changed to the angle $\theta w$," respectively. "No change" means that the azimuth angle $\theta l$ is not changed and maintained to a value in a cycle immediately before the current cycle. The CPU changes the azimuth angle $\theta l i$ to the above-mentioned angle ($-\theta 2$ or $-\theta 1$) in accordance with the change of the azimuth angle $\theta l$.

In the example of FIG. 4, the target object of the own lane L (another vehicle Vre) is positioned in the zone Z3, and the target object of the left lane Ll (another vehicle Vl) is positioned in the zone Z2. In this case, with reference to the matrix M1, the azimuth angle $\theta l$ corresponds to "no change," and hence the CPU does not change the azimuth angle $\theta l$. That is, for example, when $\theta l = \theta w$ is set in the cycle immediately before the current cycle, the CPU maintains the azimuth angle $\theta l$ at the angle $\theta w$ also in the current cycle (see FIG. 5B).

Figure 6B:
FIG. 6B is a matrix M2 to be used for determination of the azimuth angle θr.

Similarly, the CPU determines (changes or maintains), through use of the determination results of Step 340, the azimuth angle $\theta r$ based on a combination of "presence or absence of a target object of the own lane L and a zone in which this target object is positioned" and "presence or absence of a target object of the right lane Lr and a zone in which this target object is positioned." FIG. 6B shows the matrix M2 representing this combination. "Narrow" and "wide" in the matrix M2 mean that the azimuth angle $\theta r$ is "changed to the angle $-\theta n$" and the azimuth angle $\theta r$ is "changed to the angle $-\theta w$," respectively. "No change" means that the azimuth angle $\theta r$ is not changed and maintained to a value in a cycle immediately before the current cycle. The CPU changes the azimuth angle $\theta r i$ to the above-mentioned angle ($\theta 2$ or 01) in accordance with the change of the azimuth angle $\theta r$.

In the example of FIG. 4, the target object of the own lane L (another vehicle Vre) is positioned in the zone Z3, and the target object of the right lane Lr (another vehicle Vr1) is positioned in the zone Z1. In this case, with reference to the matrix M2, the azimuth angle $\theta r$ corresponds to "narrow," and hence the CPU changes the azimuth angle $\theta r$ to the angle $-\theta n$ (see FIG. 5A).

In Step 360, the CPU trims, based on the azimuth angles $\theta l$ and $\theta r$ determined in Step 350, the pieces of image data acquired in Step 310, and generates a panorama-format combined image by a well-known method through use of the trimmed pieces of image data. In this manner, the position of the left-side seam in the combined image becomes the point Pln when $\theta l = \theta n$ is set (see FIG. 5A), and becomes the point Plw when $\theta l = \theta w$ is set (see FIG. 5B). Further, the position of the right-side seam in the combined image becomes the point Prn when $\theta r = -\theta n$ is set (see FIG. 5A), and becomes the point Prw when $\theta r = -\theta w$ is set (see FIG. 5B).

In Step 370, the CPU displays the combined image generated in Step 360 on the display 12a of the display device 12. After that, the process proceeds to Step 395, and the CPU temporarily ends this routine.

Figure 11:
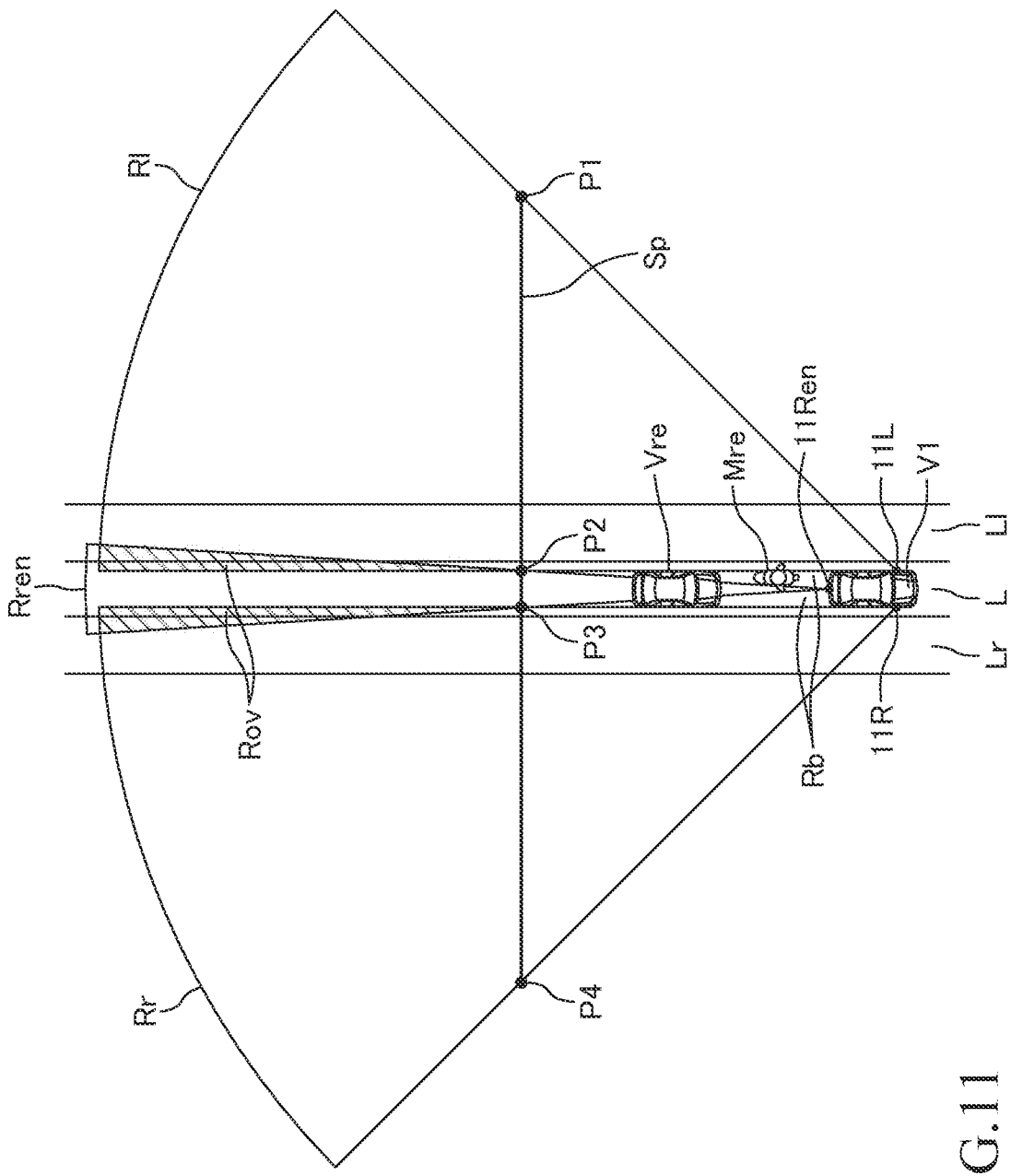
FIG. 11 is a plan view for illustrating an image pickup range of an image control system serving as a first comparative example, and is a view to be used for describing a cut-off phenomenon of an object in a combined image.
Figure 12:
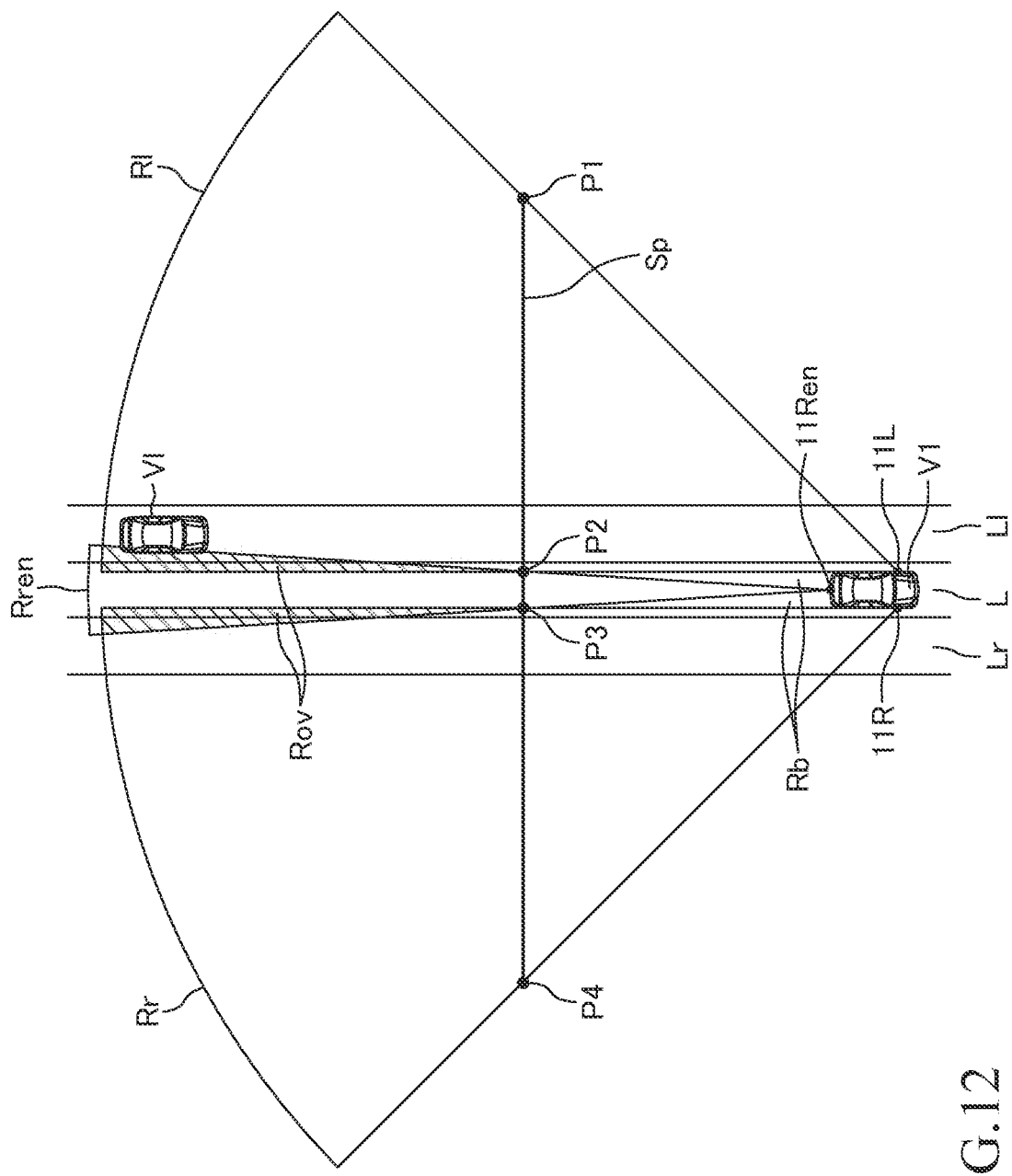
FIG. 12 is a plan view for illustrating the image pickup range of the image control system serving as the first comparative example, and is a view to be used for describing a doubling phenomenon of the object in the combined image.
Figure 13:
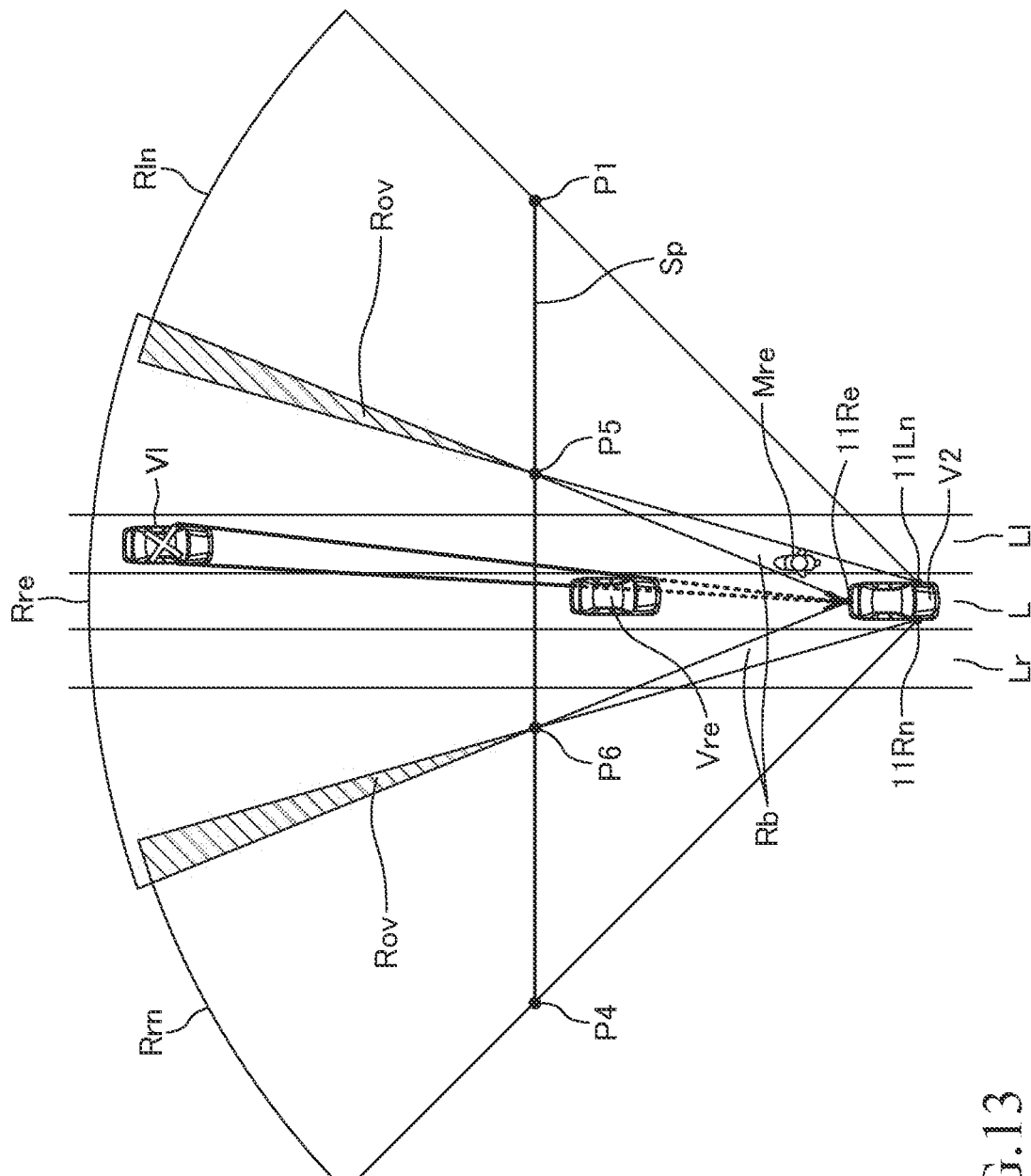
FIG. 13 is a plan view for illustrating an image pickup range of an image control system serving as a second comparative example, and is a view to be used for describing a disappearing phenomenon and a hiding phenomenon of the object in the combined image.

Next, with reference to FIG. 11 to FIG. 13, problems of image control systems serving as comparative examples are described. In the image control systems of FIG. 11 to FIG.

13, the position of the seam of the combined image cannot be changed. Like configurations as those of the image control system 1 are denoted by like reference symbols, and detailed description thereof is omitted.

In the example of FIG. 11 and FIG. 12, an image control system serving as a first comparative example is mounted on a vehicle V1. This image control system includes cameras 11Ren, 11L, and 11R. The horizontal angle of view of the camera 11Ren is relatively narrow, and the horizontal angle of view of each of the cameras 11L and 11R is relatively wide. Accordingly, an image pickup range Rren has an elongated fan shape, and each of image pickup ranges Rl and Rr has a wide fan shape. Each of a point P2 and a point P3 represents a position of a seam in a combined image. The positions of the point P2 and the point P3 cannot be changed. The vehicle V1 travels on the own lane L.

As illustrated in FIG. 11, the blind spot region Rb is formed between the image pickup ranges Rren and Rl on the front side of the point P2. Similarly, the blind spot region Rb is formed between the image pickup ranges Rren and Rr on the front side of the point P3. On the rear side of the vehicle V1, a two-wheeled motor vehicle Mre and another vehicle Vre travel on the own lane L. Almost all part of the two-wheeled motor vehicle Mre including its center part is positioned in the blind spot region Rb, and only left and right end portions thereof are included in the image pickup ranges Rl and Rre, respectively. Accordingly, the center part of the two-wheeled motor vehicle Mre is cut off from the combined image, and only the left and right end portions are displayed. Meanwhile, a center part of the another vehicle Vre is not positioned in the image pickup range Rren, and left and right end portions thereof are positioned in the blind spot regions Rb. Accordingly, the left and right end portions of the another vehicle Vre are cut off from the combined image, and only the center part thereof is displayed.

Further, as illustrated in FIG. 12, the image pickup ranges Rren and Rl partially overlap with each other on the rear side of the point P2, and thus the overlapping region Rov is formed. Similarly, the image pickup ranges Rren and Rr partially overlap with each other on the rear side of the point P3, and thus the overlapping region Rov is formed. On the rear side of the vehicle V1, the another vehicle Vl travels on the left lane Ll. A part of the another vehicle Vl is positioned in the overlapping region Rov. Accordingly, in the combined image, a part of the another vehicle Vl is displayed doubly.

As described above, when the horizontal angle of view of the rear camera is relatively narrow, there are caused such problems that a part of the object is cut off from the combined image and at least a part of the object is displayed doubly in the combined image. In the following, the former problem is also referred to as "cut-off phenomenon," and the latter problem is also referred to as "doubling phenomenon."

In the example of FIG. 13, an image control system serving as a second comparative example is mounted on a vehicle V2. This image control system includes cameras 11Re, 11Ln, and 11Rn. The horizontal angle of view of the camera 11Re is relatively wide, and the horizontal angle of view of each of the cameras 11Ln and 11Rn is relatively narrow.

Accordingly, an image pickup range Rre has a wide fan shape, and each of image pickup ranges Rln and Rrn has a slightly elongated fan shape. Each of a point P5 and a point P6 represents a position of a seam in a combined image. The positions of the point P5 and the point P6 cannot be changed. The vehicle V2 travels on the own lane L.

As illustrated in FIG. 13, the blind spot regions Rb are formed between the image pickup ranges Rre and Rln and between the image pickup ranges Rre and Rrn, on the front side of the point P5 and the point P6, respectively. On the rear side of the vehicle V2, the another vehicle Vre travels on the own lane L, and the two-wheeled motor vehicle Mre and the another vehicle Vl travel on the left lane Ll. The entire two-wheeled motor vehicle Mre is positioned in the blind spot region Rb. Accordingly, the two-wheeled motor vehicle Mre is not displayed in the combined image (disappears in the combined image). Further, both of the another vehicle Vre and the another vehicle Vl are present in the image pickup range Rre, but light from the another vehicle Vl is blocked by the another vehicle Vre and thus does not reach the camera 11Re. Thus, the camera 11Re cannot pick up the image of the another vehicle Vl, and as a result, the another vehicle Vl is not displayed in the combined image (is hidden behind another object in the combined image).

As described above, when the horizontal angle of view of the rear camera is relatively wide, there are caused such problems that the object disappears in the combined image and the object on one lane is hidden behind the object on another lane. In the following, the former problem is also referred to as "disappearing phenomenon," and the latter problem is also referred to as "hiding phenomenon."

Also in the examples of FIG. 11 and FIG. 12, the disappearing phenomenon may occur. Further, also in the example of FIG. 13, the cut-off phenomenon may occur (the doubling phenomenon may also occur, but the doubling phenomenon does not occur at least on the own lane L, the left lane Ll, and the right lane Lr, and hence this case is not considered in this specification). However, the hiding phenomenon is liable to occur when, in a case in which the horizontal angle of view of the rear camera is relatively wide, the object on the left lane Ll or the right lane Lr is positioned diagonally rearward with respect to the object on the own lane L. Accordingly, when the horizontal angle of view of the rear camera is relatively narrow, the hiding phenomenon does not possibly occur.

As described above, when the horizontal angle of view of the rear camera is relatively narrow, there are problems of cut-off, disappearing, and doubling phenomena of the object in the combined image. Meanwhile, when the horizontal angle of view of the rear camera is relatively wide, there are problems of cut-off, disappearing, and hiding phenomena of the object in the combined image.

In contrast, the image control system 1 is configured to allow the position of the seam in the combined image to be changed by changing the magnitudes of the azimuth angles θl and θr between the angles θn and the angles θw. Accordingly, among the above-mentioned phenomena (cut-off, disappearing, doubling, and hiding phenomena), occurrence of at least a phenomenon having a possibility of most affecting the traveling of the own vehicle V can be suppressed. Now, with reference to the matrix M1, specific description is given through use of FIG. 7A to FIG. 10B (the matrix M2 has a configuration similar to that of the matrix M1, and hence detailed description thereof is omitted). In FIG. 7A to FIG. 10B, the target object is absent on the right lane Lr. In this case, with reference to the matrix M2, when the target object is absent on the own lane L (see FIG. 7A and FIG. 7B), when this target object is positioned in the zone Z3 (see FIG. 8A and FIG. 8B), and when this target object is positioned in the zone Z2 (see FIG. 9A and FIG. 9B), the CPU maintains the azimuth angle θr to the value in the cycle immediately before the current cycle ("no change"). Thus, in each of FIG. 7A to FIG. 9B, the azimuth angle θr is shown assuming that the value of the azimuth angle θr at the time when the value in the cycle immediately before the current cycle is maintained is equal to the value of the azimuth angle θl in each figure.

Meanwhile, with reference to the matrix M2, when the target object of the own lane L is positioned in the zone Z1 (see FIG. 10A and FIG. 10B), the CPU changes the azimuth angle θr to the angle −θw ("wide"). Accordingly, in FIG. 10A and FIG. 10B, the azimuth angle θr is shown so that the azimuth angle θr becomes the angle −θw.

Figure 7A:
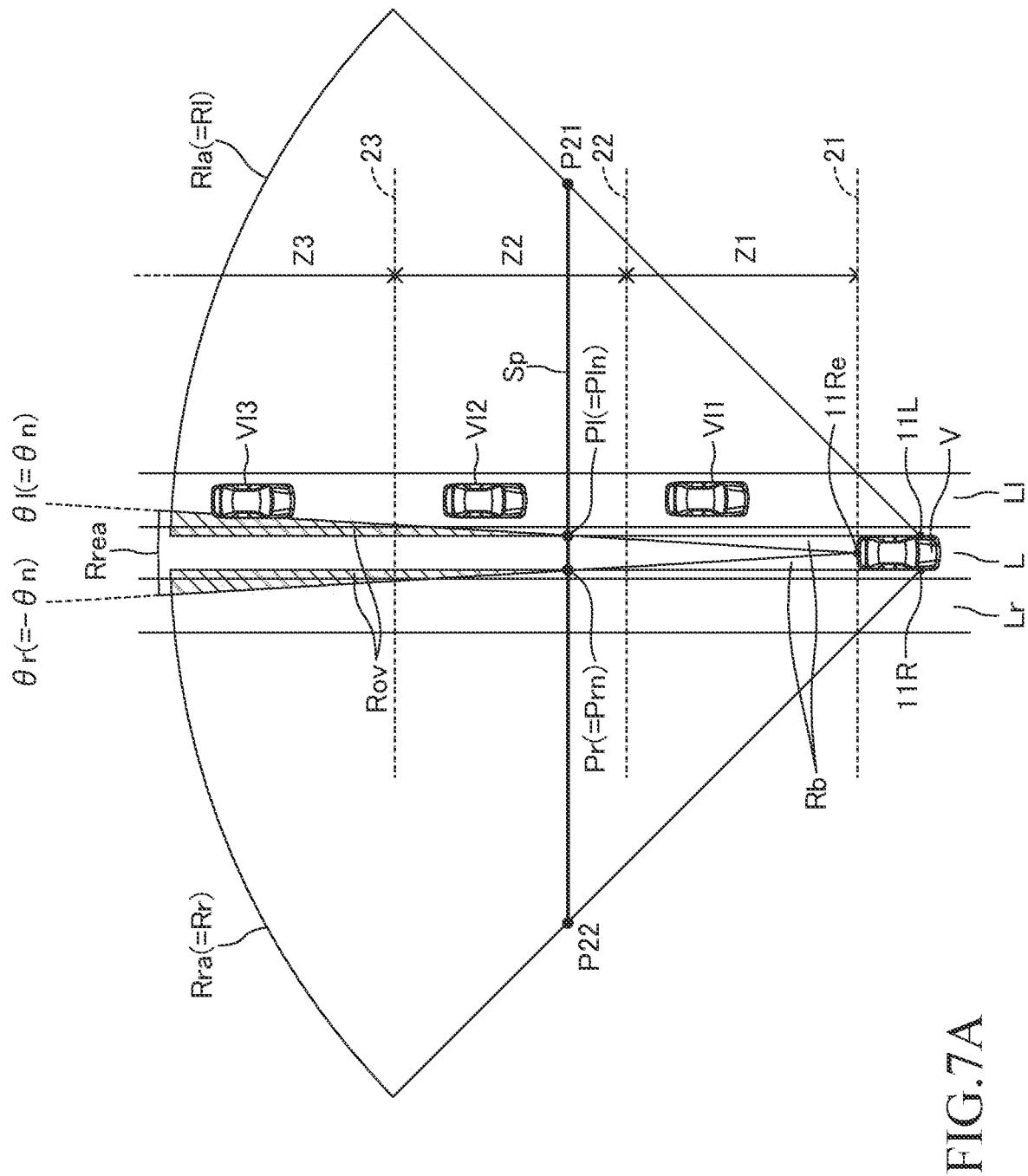
FIG. 7A is a plan view for illustrating a state in which, in a case of θl=θn, a target object is absent on an own lane, and a target object of a left lane is positioned in each zone.
Figure 7B:
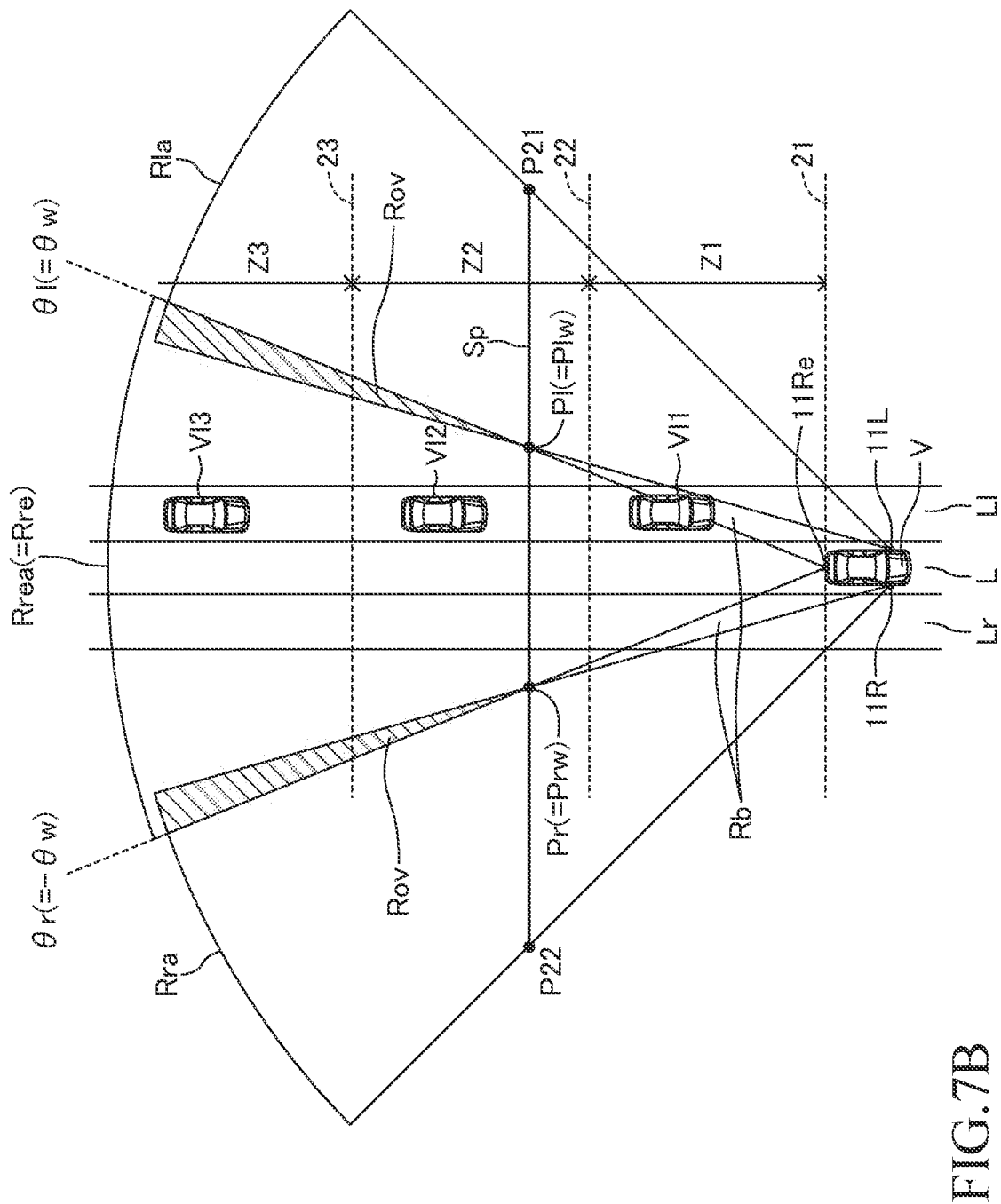
FIG. 7B is a plan view for illustrating a state in which, in a case of θl=θw, the target object is absent on the own lane, and the target object of the left lane is positioned in each zone.

1. When Target Object is Absent on Own Lane L (FIG. 7A and FIG. 7B)

1-1. When Target Object of Left Lane Ll is Another Vehicle Vl1

Another vehicle Vl1 is positioned in the zone Z1. Accordingly, the CPU changes the azimuth angle θl to the angle θn ("narrow") with reference to the matrix M1. As illustrated in FIG. 7A, in this case, the feature 2n and the feature 3n are satisfied, and hence the another vehicle Vl1 may be appropriately displayed in the combined image. In contrast, when the azimuth angle θl is changed to the angle θw, the feature 2w and the feature 3w are satisfied (see FIG. 7B), and hence the another vehicle Vl1 cannot be appropriately displayed in the combined image due to the cut-off phenomenon. Thus, in the case of Section 1-1, when the azimuth angle θl is changed to the angle θn, the target object of the left lane Ll can be appropriately displayed in the combined image.

1-2. When Target Object of Left Lane Ll is Another Vehicle Vl2

Another vehicle Vl2 is positioned in the zone Z2. Accordingly, the CPU maintains the azimuth angle θl to the value in the cycle immediately before the current cycle with reference to the matrix M1 ("no change"). When the azimuth angle θl in the cycle immediately before the current cycle is the angle θn, the CPU maintains θl=θn in the current cycle. In this case, as illustrated in FIG. 7A, the feature 5n and the feature 7n are satisfied, and hence the another vehicle Vl2 may be appropriately displayed in the combined image. Meanwhile, when the azimuth angle θl in the cycle immediately before the current cycle is the angle θw, the CPU maintains θl=θw in the current cycle. In this case, as illustrated in FIG. 7B, the feature 5w and the feature 7w are satisfied, and hence the another vehicle Vl2 may be appropriately displayed in the combined image. That is, in the case of Section 1-2, regardless of the angle (θn or θw) to which the azimuth angle θl is changed, the target object of the left lane Ll can be appropriately displayed in the combined image.

1-3. When Target Object of Left Lane Ll is Another Vehicle Vl3

Another vehicle Vl3 is positioned in the zone Z3. Accordingly, the CPU changes the azimuth angle θl to the angle θw ("wide") with reference to the matrix M1. As illustrated in FIG. 7B, in this case, the feature 8w and the feature 10w are satisfied, and hence the another vehicle Vl3 may be appropriately displayed in the combined image. In contrast, when the azimuth angle θl is changed to the angle θn, the feature 8n and the feature 10n are satisfied (see FIG. 7A), and hence the another vehicle Vl3 cannot be appropriately displayed in the combined image due to the doubling phenomenon. Thus, in the case of Section 1-3, when the azimuth angle θl is changed to the angle θw, the target object of the left lane Ll can be appropriately displayed in the combined image.

1-4. When Target Object is Absent on Left Lane Ll

In this case, the target object is not present on any of the own lane L or the left lane Ll, and hence regardless of the angle to which the azimuth angle θl is changed, the above-mentioned phenomena (cut-off, disappearing, doubling, and hiding phenomena) do not possibly occur.

Figure 8A:
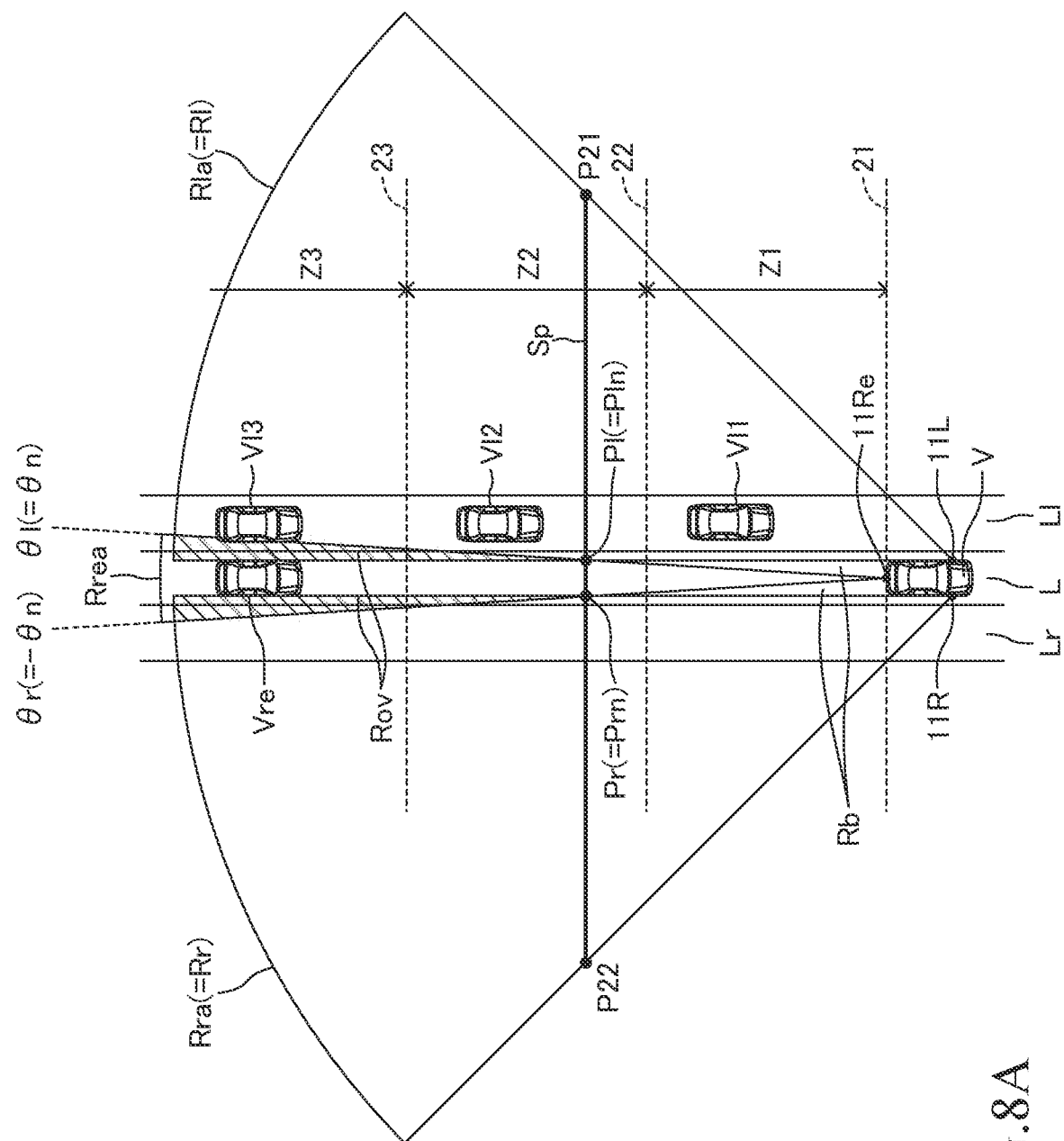
FIG. 8A is a plan view for illustrating a state in which, in the case of θl=θn, the target object of the own lane is positioned in a zone Z3, and the target object of the left lane is positioned in each zone.
Figure 8B:
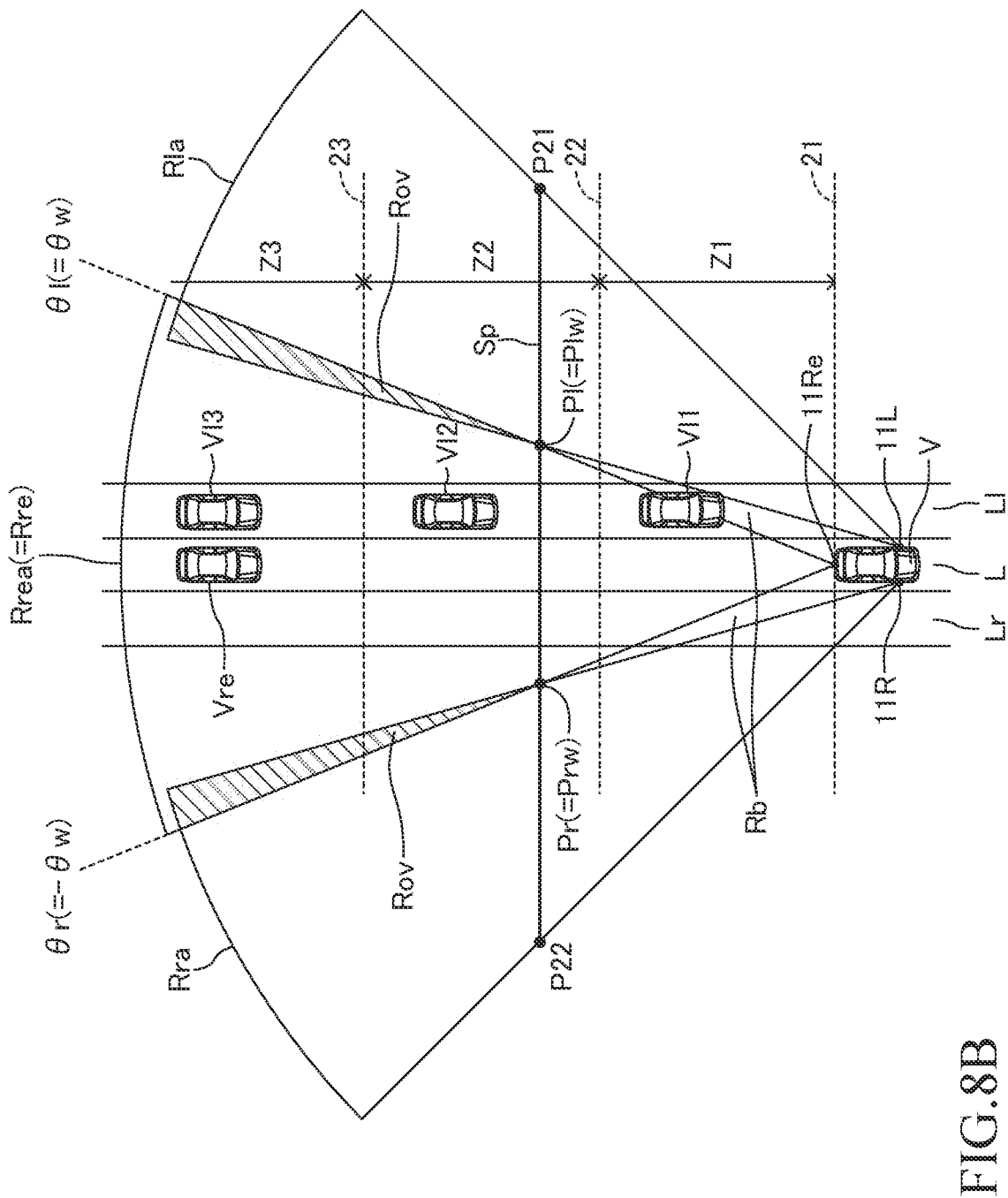
FIG. 8B is a plan view for illustrating a state in which, in the case of θl=θw, the target object of the own lane is positioned in the zone Z3, and the target object of the left lane is positioned in each zone.

2. When Target Object of Own Lane L (Another Vehicle Vre) is Positioned in Zone Z3 (FIG. 8A and FIG. 8B)

2-1. When Target Object of Left Lane Ll is Another Vehicle Vl1

The another vehicle Vl1 is positioned in the zone Z1. Accordingly, the CPU changes the azimuth angle θl to the angle θn ("narrow") with reference to the matrix M1. As illustrated in FIG. 8A, in this case, the feature 8n and the feature 9n are satisfied for the another vehicle Vre, and hence the another vehicle Vre may be appropriately displayed in the combined image. Further, the feature 2n and the feature 3n are satisfied for the another vehicle Vl1, and hence the another vehicle Vl1 may be appropriately displayed in the combined image.

In contrast, when the azimuth angle θl is changed to the angle θw (see FIG. 8B), the feature 8w and the feature 9w are satisfied for the another vehicle Vre, and hence the another vehicle Vre may be appropriately displayed in the combined image. Meanwhile, the feature 2w and the feature 3w are satisfied for the another vehicle Vl1, and hence the another vehicle Vl1 cannot be appropriately displayed in the combined image due to the cut-off phenomenon.

Thus, in the case of Section 2-1, when the azimuth angle θl is changed to the angle θn, the target objects of the own lane L and the left lane Ll can be appropriately displayed in the combined image.

2-2. When Target Object of Left Lane Ll is Another Vehicle Vl2

The another vehicle Vl2 is positioned in the zone Z2. Accordingly, the CPU maintains the azimuth angle θl to the value in the cycle immediately before the current cycle ("no change") with reference to the matrix M1. When the azimuth angle θl in the cycle immediately before the current cycle is the angle θn, the CPU maintains θl=θn in the current cycle. In this case, as illustrated in FIG. 8A, the feature 8n and the feature 9n are satisfied for the another vehicle Vre, and hence the another vehicle Vre may be appropriately displayed in the combined image. Further, the feature 5n and the feature 7n are satisfied for the another vehicle Vl2, and hence the another vehicle Vl2 may be appropriately displayed in the combined image.

Meanwhile, when the azimuth angle θl in the cycle immediately before the current cycle is the angle θw, the CPU maintains θl=θw in the current cycle. In this case, as illustrated in FIG. 8B, the feature 8w and the feature 9w are satisfied for the another vehicle Vre, and hence the another vehicle Vre may be appropriately displayed in the combined image. Further, the feature 5w and the feature 7w are satisfied for the another vehicle Vl2, and hence the another vehicle Vl2 may be appropriately displayed in the combined image.

Thus, in the case of Section 2-2, regardless of the angle (θn or θw) to which the azimuth angle θl is changed, the target objects of the own lane L and the left lane Ll can be appropriately displayed in the combined image.

2-3. When Target Object of Left Lane Ll is Another Vehicle Vl3

The another vehicle Vl3 is positioned in the zone Z3. Accordingly, the CPU changes the azimuth angle θl to the angle θw ("wide") with reference to the matrix M1. As illustrated in FIG. 8B, in this case, the feature 8w and the feature 9w are satisfied for the another vehicle Vre, and hence the another vehicle Vre may be appropriately displayed in the combined image. Further, the feature 8w and the feature 10w are satisfied for the another vehicle Vl3, and hence the another vehicle Vl3 may be appropriately displayed in the combined image.

In contrast, when the azimuth angle θl is changed to the angle θn (see FIG. 8A), the feature 8n and the feature 9n are satisfied for the another vehicle Vre, and hence the another vehicle Vre may be appropriately displayed in the combined image. Meanwhile, the feature 8n and the feature 10n are satisfied for the another vehicle Vl3, and hence the another vehicle Vl3 cannot be appropriately displayed in the combined image due to the doubling phenomenon.

Thus, in the case of Section 2-3, when the azimuth angle θl is changed to the angle θw, the target objects of the own lane L and the left lane Ll can be appropriately displayed in the combined image.

2-4. When Target Object is Absent on Left Lane Ll

In this case, the CPU maintains the azimuth angle θl to the value in the cycle immediately before the current cycle ("no change") with reference to the matrix M1. When the azimuth angle θl in the cycle immediately before the current cycle is the angle θn, the CPU maintains θl=θn in the current cycle. In this case, as illustrated in FIG. 8A, the feature 8n and the feature 9n are satisfied for the another vehicle Vre, and hence the another vehicle Vre may be appropriately displayed in the combined image.

Meanwhile, when the azimuth angle θl in the cycle immediately before the current cycle is the angle θw, the CPU maintains θl=θw in the current cycle. In this case, as illustrated in FIG. 8B, the feature 8w and the feature 9w are satisfied for the another vehicle Vre, and hence the another vehicle Vre may be appropriately displayed in the combined image.

Thus, in the case of Section 2-4, regardless of the angle (θn or θw) to which the azimuth angle θl is changed, the target object of the own lane L can be appropriately displayed in the combined image.

Figure 9A:
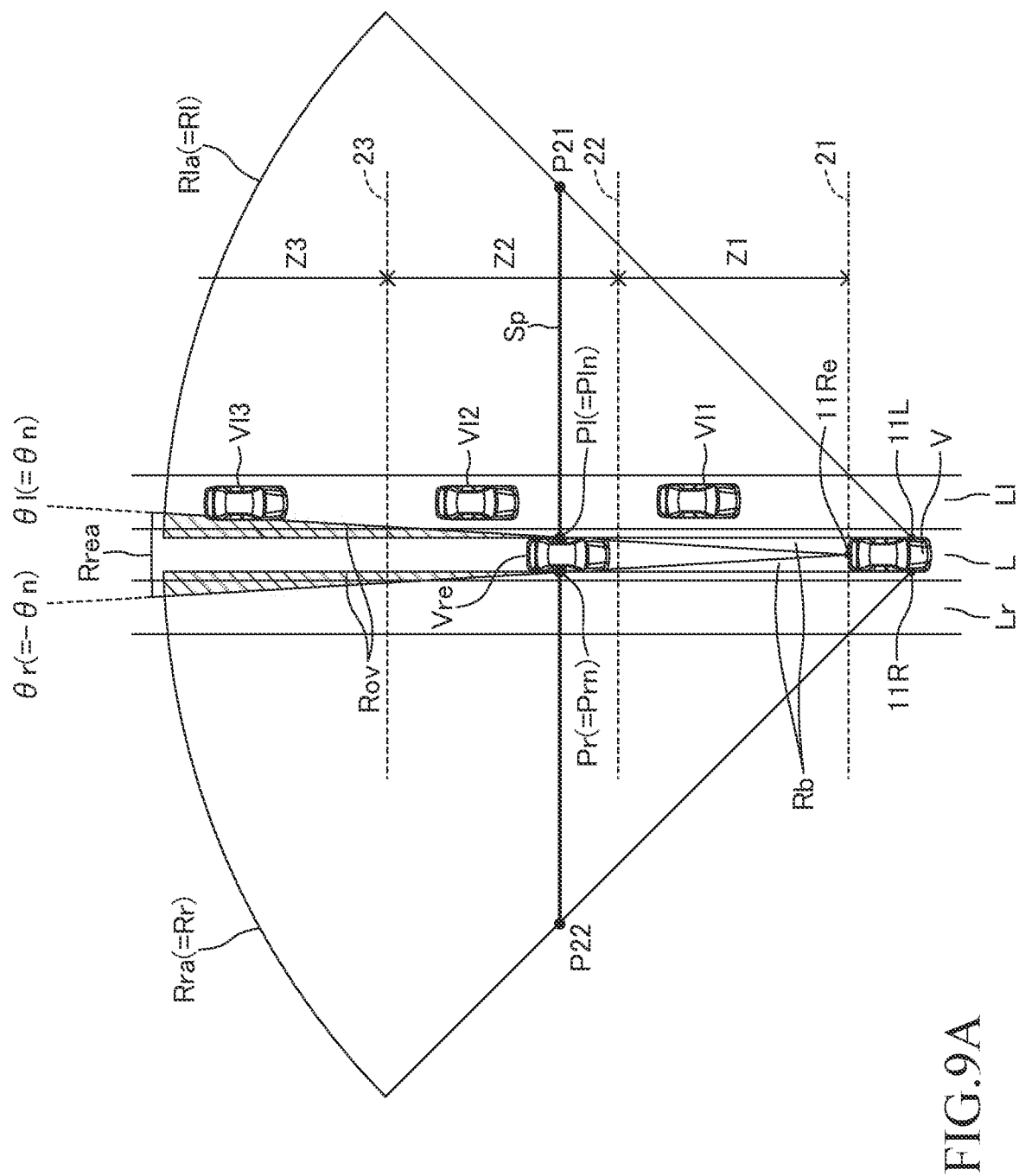
FIG. 9A is a plan view for illustrating a state in which, in the case of θl=θn, the target object of the own lane is positioned in a zone Z2, and the target object of the left lane is positioned in each zone.
Figure 9B:
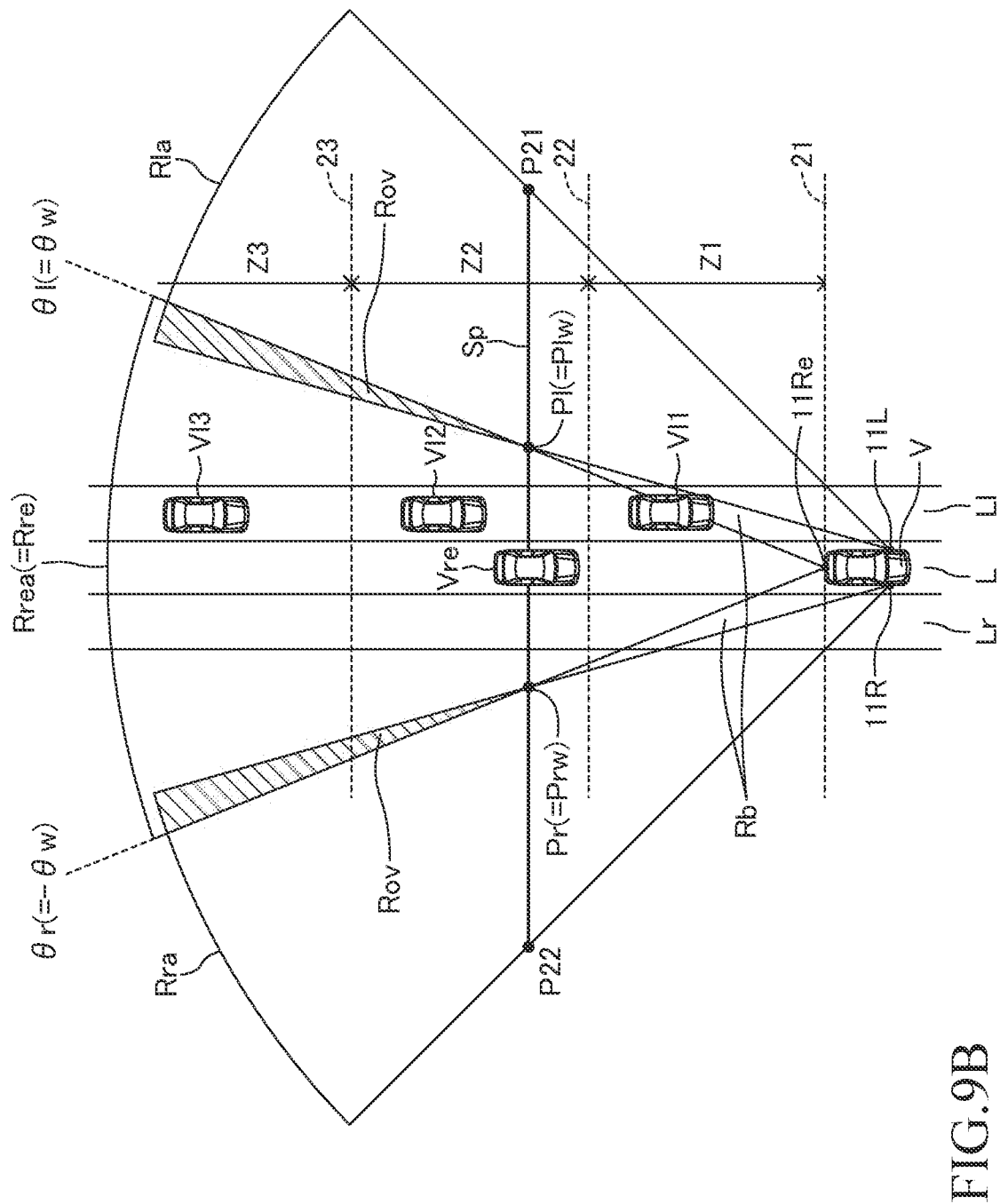
FIG. 9B is a plan view for illustrating a state in which, in the case of θl=θw, the target object of the own lane is positioned in the zone Z2, and the target object of the left lane is positioned in each zone.

3. When Target Object of Own Lane L (Another Vehicle Vre) is Positioned in Zone Z2 (FIG. 9A and FIG. 9B)

3-1. When Target Object of Left Lane Ll is Another Vehicle Vl1

The another vehicle Vl1 is positioned in the zone Z1. Accordingly, the CPU changes the azimuth angle θl to the angle θn ("narrow") with reference to the matrix M1. As illustrated in FIG. 9A, in this case, the feature 4n and the feature 6n are satisfied for the another vehicle Vre, and hence the another vehicle Vre may be appropriately displayed in the combined image. Further, the feature 2n and the feature 3n are satisfied for the another vehicle Vl1, and hence the another vehicle Vl1 may be appropriately displayed in the combined image.

In contrast, when the azimuth angle θl is changed to the angle θw (see FIG. 9B), the feature 4w and the feature 6w are satisfied for the another vehicle Vre, and hence the another vehicle Vre may be appropriately displayed in the combined image. Meanwhile, the feature 2w and the feature 3w are satisfied for the another vehicle Vl1, and hence the another vehicle Vl1 cannot be appropriately displayed in the combined image due to the cut-off phenomenon.

Thus, in the case of Section 3-1, when the azimuth angle θl is changed to the angle θn, the target objects of the own lane L and the left lane Ll can be appropriately displayed in the combined image.

3-2. When Target Object of Left Lane Ll is Another Vehicle Vl2

The another vehicle Vl2 is positioned in the zone Z2. Accordingly, the CPU maintains the azimuth angle θl to the value in the cycle immediately before the current cycle ("no change") with reference to the matrix M1. When the azimuth angle θl in the cycle immediately before the current cycle is the angle θn, the CPU maintains θl=θn in the current cycle. In this case, as illustrated in FIG. 9A, the feature 4n and the feature 6n are satisfied for the another vehicle Vre, and hence the another vehicle Vre may be appropriately displayed in the combined image. Further, the feature 5n and the feature 7n are satisfied for the another vehicle Vl2, and hence the another vehicle Vl2 may be appropriately displayed in the combined image.

Meanwhile, when the azimuth angle θl in the cycle immediately before the current cycle is the angle θw, the CPU maintains θl=θw in the current cycle. In this case, as illustrated in FIG. 9B, the feature 4w and the feature 6w are satisfied for the another vehicle Vre, and hence the another vehicle Vre may be appropriately displayed in the combined image. Further, the feature 5w and the feature 7w are satisfied for the another vehicle Vl2, and hence the another vehicle Vl2 may be appropriately displayed in the combined image.

Thus, in the case of Section 3-2, regardless of the angle (θn or θw) to which the azimuth angle θl is changed, the target objects of the own lane L and the left lane Ll can be appropriately displayed in the combined image.

3-3. When Target Object of Left Lane Ll is Another Vehicle Vl3

The another vehicle Vl3 is positioned in the zone Z3. Accordingly, the CPU changes the azimuth angle θl to the angle θn ("narrow") with reference to the matrix M1. As illustrated in FIG. 9A, in this case, the feature 4n and the feature 6n are satisfied for the another vehicle Vre, and hence the another vehicle Vre may be appropriately displayed in the combined image. Meanwhile, the feature 8n and the feature 10n are satisfied for the another vehicle Vl3, and hence the another vehicle Vl3 cannot be appropriately displayed in the combined image due to the doubling phenomenon.

In contrast, when the azimuth angle θl is changed to the angle θw (see FIG. 9B), the feature 4w and the feature 6w are satisfied for the another vehicle Vre, and hence the another vehicle Vre may be appropriately displayed in the combined image. Meanwhile, the feature 8w and the feature 10w are satisfied for the another vehicle Vl3, but the another vehicle Vl3 is positioned on the diagonally rearward left side of the another vehicle Vre. Thus, depending on the positional relationship of both the vehicles, there is a possibility that the hiding phenomenon occurs.

In general, the doubling phenomenon is a problem that degrades the appearance of the combined image, while the hiding phenomenon is a problem that has a possibility of causing reduction of the traveling safety of the vehicle. Accordingly, in Section 3-3, priority is given more to solving the hiding phenomenon than to solving the doubling phenomenon. With this configuration, in the case of Section 3-3, the azimuth angle θl is changed to the angle θn so that the target objects of the own lane L and the left lane Ll can be appropriately displayed in the combined image.

3-4. When Target Object is Absent on Left Lane Ll

In this case, the CPU maintains the azimuth angle θl to the value in the cycle immediately before the current cycle ("no change") with reference to the matrix M1. When the azimuth angle θl in the cycle immediately before the current cycle is the angle θn, the CPU maintains θl=θn in the current cycle. In this case, as illustrated in FIG. 9A, the feature 4n and the feature 6n are satisfied for the another vehicle Vre, and hence the another vehicle Vre may be appropriately displayed in the combined image.

Meanwhile, when the azimuth angle θl in the cycle immediately before the current cycle is the angle θw, the CPU maintains θl=θw in the current cycle. In this case, as illustrated in FIG. 9B, the feature 4w and the feature 6w are satisfied for the another vehicle Vre, and hence the another vehicle Vre may be appropriately displayed in the combined image.

Thus, in the case of Section 3-4, regardless of the angle (θn or θw) to which the azimuth angle θl is changed, the target object of the own lane L can be appropriately displayed in the combined image.

Among the sixteen components of the matrix M1, the component of "no change" may be set to any of "narrow" or "wide" in advance. The same holds true for the matrix M2. With this configuration, the frequency of switching the combined image is increased, but the control content can be simplified.

Figure 10A:
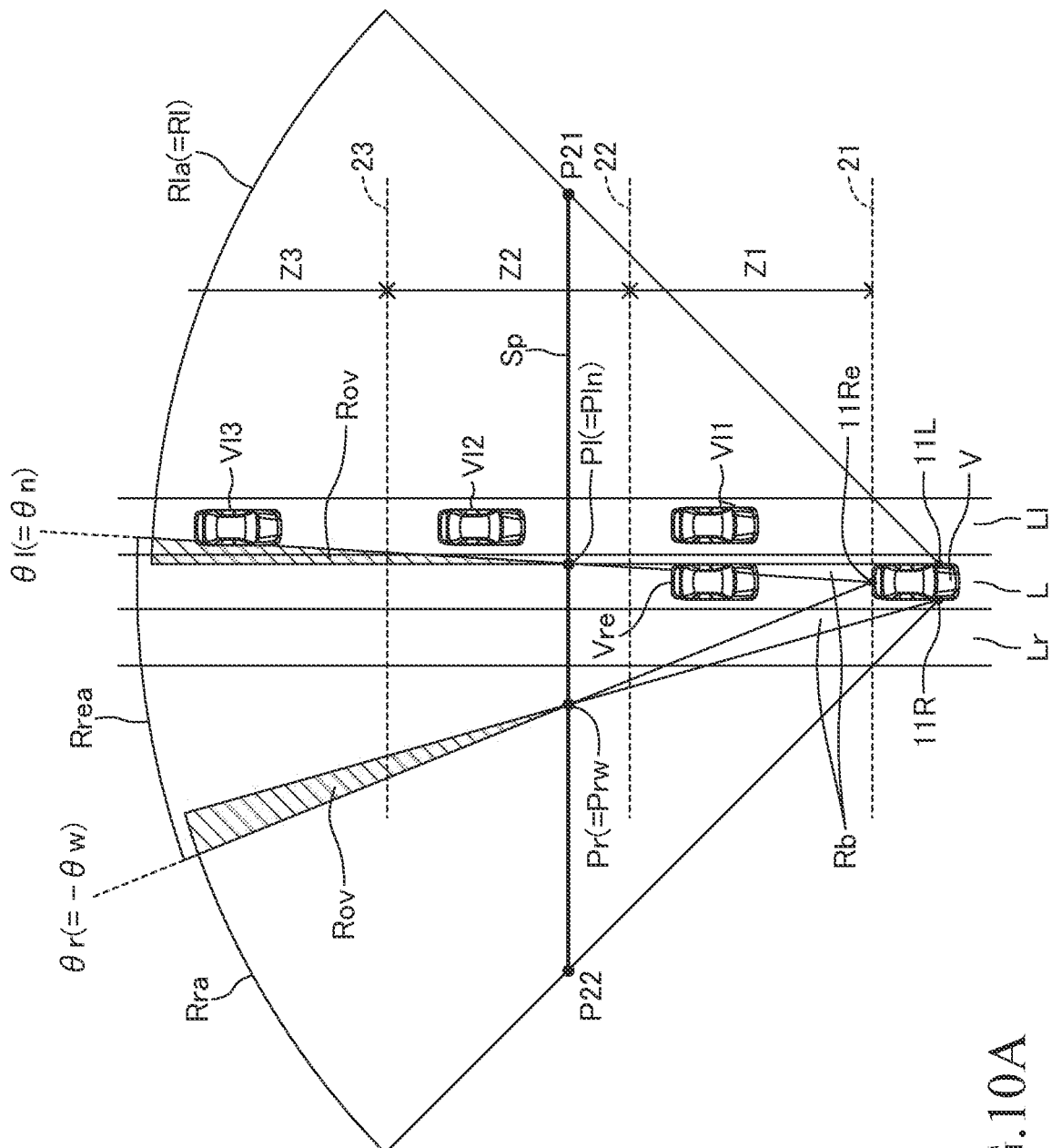
FIG. 10A is a plan view for illustrating a state in which, in the case of θl=θn, the target object of the own lane is positioned in a zone Z1, and the target object of the left lane is positioned in each zone.
Figure 10B:
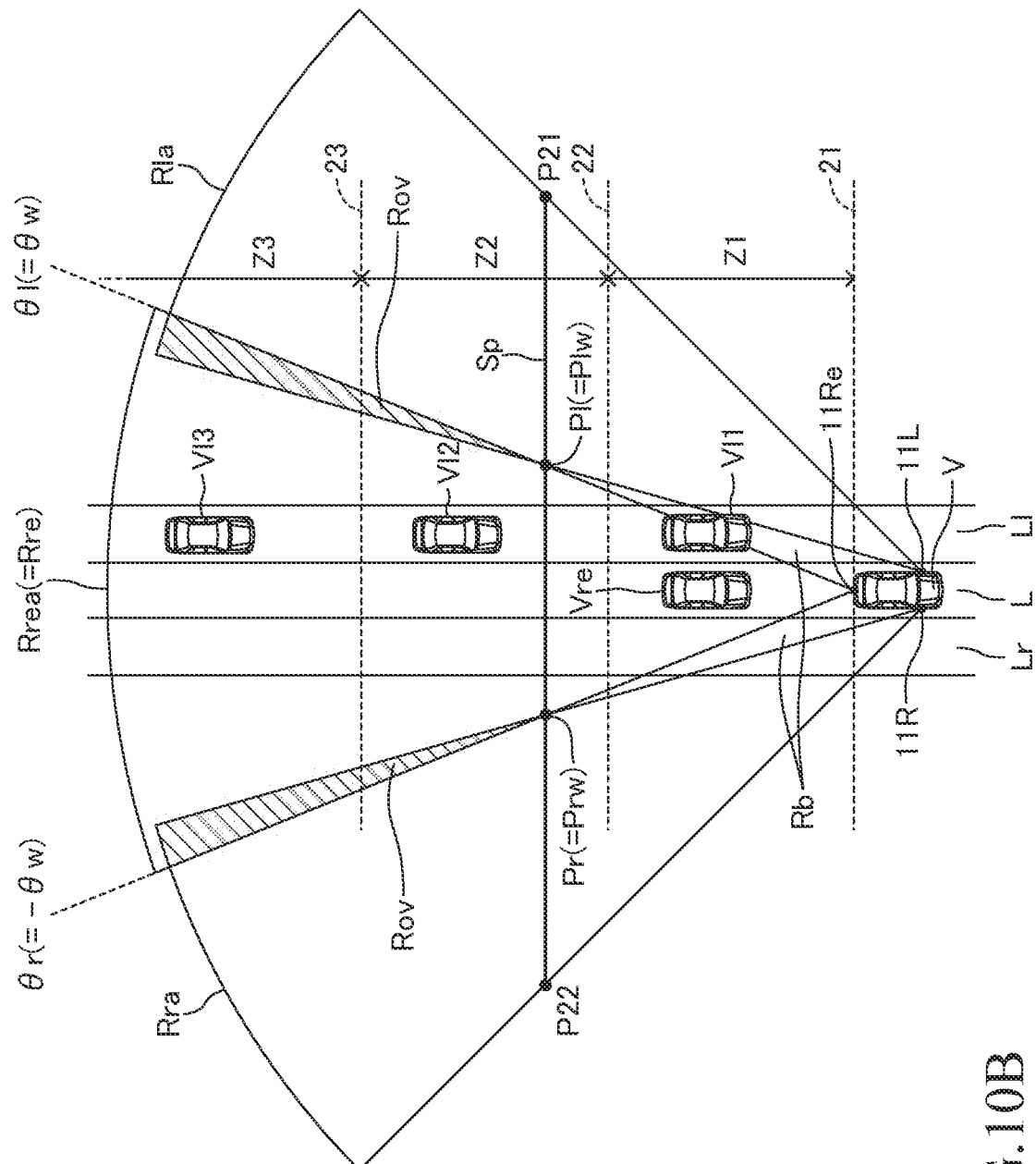
FIG. 10B is a plan view for illustrating a state in which, in the case of θl=θw, the target object of the own lane is positioned in the zone Z1, and the target object of the left lane is positioned in each zone.

4. When Target Object of Own Lane L (Another Vehicle Vre) is Positioned in Zone Z1 (FIG. 10A and FIG. 10B)

4-1. When Target Object of Left Lane Ll is Another Vehicle Vl1

The another vehicle Vl1 is positioned in the zone Z1. Accordingly, the CPU changes the azimuth angle θl to the angle θn ("narrow") with reference to the matrix M1. As illustrated in FIG. 10A, in this case, the feature 1n and the feature 3n are satisfied for the another vehicle Vre, and hence the another vehicle Vre cannot be appropriately displayed in the combined image due to the cut-off phenomenon. Meanwhile, the feature 2n and the feature 3n are satisfied for the another vehicle Vl1, and hence the another vehicle Vl1 may be appropriately displayed in the combined image.

In contrast, when the azimuth angle θl is changed to the angle θw (see FIG. 10B), the feature 1w and the feature 3w are satisfied for the another vehicle Vre, and hence, unless the another vehicle Vre comes excessively close to the own vehicle V, the another vehicle Vre may be appropriately displayed in the combined image. Meanwhile, the feature 2w and the feature 3w are satisfied for the another vehicle Vl1, and hence the another vehicle Vl1 cannot be appropriately displayed in the combined image due to the cut-off phenomenon. In some cases, the disappearing phenomenon occurs depending on the size of the blind spot region Rb. Further, when the target object of the left lane Ll is a two-wheeled motor vehicle, the possibility that the disappearing phenomenon occurs is increased.

With reference to the feature 1n, when the cut-off phenomenon occurs in the another vehicle Vre (that is, the target object of the own lane L), there is a high possibility that a left front corner portion (that is, a part in which a left turn signal lamp is installed) of the another vehicle Vre is positioned in the blind spot region Rb. Accordingly, the left turn signal lamp of the another vehicle Vre is not displayed in the combined image, and the driver of the own vehicle V cannot determine from the combined image whether or not the another vehicle Vre intends to change the lane. Thus, when the another vehicle Vre changes the lane to the left lane Ll at the timing at which the own vehicle V changes the lane to the left lane Ll, in some cases, the another vehicle Vre may excessively come close to or come into contact with the own vehicle V depending on the paths of both the vehicles. Thus, there is a possibility that the traveling safety of the own vehicle V is reduced.

Meanwhile, when the cut-off phenomenon or the disappearing phenomenon occurs in the another vehicle Vl1, there is a possibility that the driver cannot appropriately recognize the presence of the another vehicle Vl1 from the combined image. When the own vehicle V changes the lane to the left lane Ll while the driver does not notice the presence of the another vehicle Vl1, in some cases, the own vehicle V may come into contact with the another vehicle Vl1 traveling straight on the left lane Ll. Thus, there is a possibility that the traveling safety of the own vehicle V is reduced.

In this case, with reference to the feature 1n, the blind spot region Rb is not so large, and hence the possibility that the disappearing phenomenon occurs in the another vehicle Vre is extremely low. That is, the cut-off phenomenon occurs in the another vehicle Vre, but the driver can recognize the presence of the another vehicle Vre itself from the combined image. In contrast, when the disappearing phenomenon occurs in the another vehicle Vl1, the driver cannot recognize the presence of the another vehicle Vl1 from the combined image. Accordingly, as compared to the cut-off phenomenon of the target object of the own lane L (another vehicle Vre), the cut-off or disappearing phenomenon of the target object of the left lane Ll (another vehicle Vl1) has a higher possibility of affecting the traveling of the own vehicle V. Thus, in Section 4-1, priority is given more to solving the cut-off or disappearing phenomenon of the target object of the left lane Ll than to solving the cut-off phenomenon of the target object of the own lane L. With this configuration, in the case of Section 4-1, when the azimuth angle θl is changed to the angle θn, the target objects of the own lane L and the left lane Ll can be appropriately displayed in the combined image.

4-2. When Target Object of Left Lane Ll is Another Vehicle Vl2

The another vehicle Vl2 is positioned in the zone Z2. Accordingly, the CPU changes the azimuth angle θl to the angle θw ("wide") with reference to the matrix M1. As illustrated in FIG. 10B, in this case, the feature 1w and the feature 3w are satisfied for the another vehicle Vre, and hence, unless the another vehicle Vre comes excessively close to the own vehicle V, the another vehicle Vre may be appropriately displayed in the combined image. Meanwhile, the feature 5w and the feature 7w are satisfied for the another vehicle Vl2, but the another vehicle Vl2 is positioned on the diagonally rearward left side of the another vehicle Vre. Thus, there is a possibility that the hiding phenomenon occurs depending on the positional relationship of both the vehicles.

In contrast, when the azimuth angle θl is changed to the angle θn (see FIG. 10A), the feature 1n and the feature 3n are satisfied for the another vehicle Vre, and hence the another vehicle Vre cannot be appropriately displayed in the combined image due to the cut-off phenomenon. Meanwhile, the feature 5n and the feature 7n are satisfied for the another vehicle Vl2, and hence the another vehicle Vl2 may be appropriately displayed in the combined image.

Similarly to the case of Section 4-1 described above, when the cut-off phenomenon occurs in the another vehicle Vre, the driver cannot determine from the combined image whether or not the another vehicle Vre intends to change the lane. Accordingly, there is a possibility that the traveling safety of the own vehicle V is reduced.

In general, the cut-off phenomenon has a higher possibility of affecting the traveling of the own vehicle V as compared to the hiding phenomenon. Accordingly, in Section 4-2, priority is given more to solving the cut-off phenomenon than to solving the hiding phenomenon. With this configuration, in the case of Section 4-2, when the azimuth angle θl is changed to the angle θw, the target objects of the own lane L and the left lane Ll can be appropriately displayed in the combined image.

4-3. When Target Object of Left Lane Ll is Another Vehicle Vl3

The another vehicle Vl3 is positioned in the zone Z3. Accordingly, the CPU changes the azimuth angle θl to the angle θw ("wide") with reference to the matrix M1. As illustrated in FIG. 10B, in this case, the feature 1w and the feature 3w are satisfied for the another vehicle Vre, and hence, unless the another vehicle Vre comes excessively close to the own vehicle V, the another vehicle Vre may be appropriately displayed in the combined image. Meanwhile, the feature 8w and the feature 10w are satisfied for the another vehicle Vl3, but the another vehicle Vl3 is positioned on the diagonally rearward left side of the another vehicle Vre. Thus, there is a possibility that the hiding phenomenon occurs depending on the positional relationship of both the vehicles.

In contrast, when the azimuth angle θl is changed to the angle θn (see FIG. 10A), the feature 1n and the feature 3n are satisfied for the another vehicle Vre, and hence the another vehicle Vre cannot be appropriately displayed in the combined image due to the cut-off phenomenon. Further, the feature 8n and the feature 10n are satisfied for the another vehicle Vl3, and hence the another vehicle Vl3 cannot be appropriately displayed in the combined image due to the doubling phenomenon.

Similarly to the case of Section 4-1 described above, when the cut-off phenomenon occurs in the another vehicle Vre, the driver cannot determine from the combined image whether or not the another vehicle Vre intends to change the lane. Accordingly, there is a possibility that the traveling safety of the own vehicle V is reduced.

As described above, the cut-off phenomenon has a higher possibility of affecting the traveling of the own vehicle V as compared to the hiding phenomenon. Accordingly, in Section 4-3, priority is given more to solving the cut-off phenomenon than to solving the hiding phenomenon. With this configuration, in the case of Section 4-3, when the azimuth angle θl is changed to the angle θw, the target objects of the own lane L and the left lane Ll can be appropriately displayed in the combined image.

4-4. When Target Object is Absent on Left Lane Ll

In this case, the CPU changes the azimuth angle θl to the angle θw ("wide") with reference to the matrix M1. As illustrated in FIG. 10B, in this case, the feature 1w and the feature 3w are satisfied for the another vehicle Vre, and hence, unless the another vehicle Vre comes excessively close to the own vehicle V, the another vehicle Vre may be appropriately displayed in the combined image.

In contrast, when the azimuth angle θl is changed to the angle θn (see FIG. 10A), the feature 1n and the feature 3n are satisfied for the another vehicle Vre, and hence the another vehicle Vre cannot be appropriately displayed in the combined image due to the cut-off phenomenon.

Thus, in the case of Section 4-4, when the azimuth angle θl is changed to the angle θw, the target object of the own lane L can be appropriately displayed in the combined image.

As described above, in the image control system 1, when the combined image is to be generated, the magnitude of the azimuth angle θl (or the azimuth angle θr) is changed based on the combination of "presence or absence of a target object of the own lane L and a level of closeness to this target object" and "presence or absence of a target object of the left lane Ll (or a target object of the right lane Lr) and a level of closeness to this target object." In addition, when the magnitude of the azimuth angle θl (or the azimuth angle θr) is changed, the magnitude of the azimuth angle θli (or the azimuth angle θri) is changed in accordance with this change. When the magnitude of the azimuth angle θl (or the azimuth angle θr) and the magnitude of the azimuth angle θli (or the azimuth angle θri) are appropriately changed independently of each other based on this combination, an object having a relatively high possibility of affecting the traveling of the vehicle (that is, a target object of the own lane L and a target object of the left lane Ll (or a target object of the right lane Lr)) can be appropriately displayed in the combined image.

Further, the change of the azimuth angle θl (or the azimuth angle θr) and the change of the azimuth angle θli (or the azimuth angle θri) are performed based on only information on the target object of the own lane L and the target object of the left lane Ll (or the target object of the right lane Lr), and information on other objects is not considered. Thus, an increase of a processing load applied when the combined image is generated can be suppressed.

In particular, in the at least one embodiment, the azimuth angle θl (or the azimuth angle θr) can be changed between two types of angles, that is, the angle θn (or −θn) and the angle θw (or −θw). Accordingly, with a relatively simple configuration, the target object of each of the lanes L, Ll, and Lr can be appropriately displayed in the combined image.

In the above, the image control system according to the at least one embodiment have been described, but the present disclosure is not limited to the above-mentioned at least one embodiment, and various changes are possible within the range not departing from the object of the present disclosure.

For example, as shown in FIG. 14A, the azimuth angle θl may be determined with reference to a matrix M3 serving as a modification example, in place of the matrix M1. Similarly, as shown in FIG. 14B, the azimuth angle θr may be determined with reference to a matrix M4 serving as another modification example, in place of the matrix M2. The matrix M3 (or M4) is different from the matrix M1 (or M2) in the following points.

- Among components of the matrix M3 (or M4), a component corresponding to the component of "no change" in the matrix M1 (or M2) is set to "narrow."
- Among the components of the matrix M3 (or M4), a component corresponding to a case in which the target object is absent on the own lane L and the target object of the left lane Ll (or the right lane Lr) is positioned in the zone Z3 (hereinafter referred to as "component C1") is set to "narrow."
- Among the components of the matrix M3 (or M4), a component corresponding to a case in which both of the target object of the own lane L and the target object of the left lane Ll (or the right lane Lr) are positioned in the zone Z3 (hereinafter referred to as "component C2") is set to "narrow."

With this configuration, among the sixteen components of the matrix M3 (or M4), thirteen components are set to "narrow," and hence the frequency of changing the azimuth angle θl (or θr) (that is, the frequency of moving the position of the seam of the combined image) is greatly reduced. In this manner, the frequency of switching the combined image is reduced, and hence a possibility that the driver feels bothered due to the frequent switching can be reduced. In addition, the frequency at which the driver notices the switching and turns his or her eyes to the display 12a can be reduced. Meanwhile, when the component C1 and the component C2 are set to "narrow," the doubling phenomenon occurs in the target object of the left lane Ll (see FIG. 7A and FIG. 8A). However, as described above, the doubling phenomenon merely degrades the appearance of the combined image, and hence the doubling phenomenon does not affect the traveling of the own vehicle V so much. That is, in this configuration, priority is given more to "reducing the frequency of switching the combined image" than to "occurrence of the doubling phenomenon" (the occurrence of the doubling phenomenon is allowed).

With this configuration, even when the ECU 10 can calculate only the distance to a relatively close object (typically, an object positioned in the zone Z1) (in other words, even when a computation limit distance of the ECU 10 only includes the zone Z1), the azimuth angle θl (or θr) can be determined in accordance with the matrix M3 (or M4). That is, the ECU 10 is configured to change the azimuth angle θl (or θr) to the angle θw (−θw) ("wide") only in a case in which the target object of the own lane L is positioned within the computation limit distance and the target object of the left lane Ll (or the right lane Lr) is not positioned within the computation limit distance (including a case in which this target object is absent), and to change the azimuth angle θl (or θr) to the angle θn (−θn) ("narrow") in other cases. In this manner, the present disclosure is applicable also to an image control system in which the computation limit distance of the ECU 10 does not reach the zone Z3.

Further, the ECU 10 may be configured to continuously change the azimuth angle θl (or θr) and the azimuth angle θli (or θri) when changing those azimuth angles. With this configuration, the movement of the seam of the combined image becomes smoother, and hence the switching of the combined image can be performed smoothly (naturally). Thus, a possibility that the driver feels bothered by how the combined image is switched can be reduced.

Moreover, in a case in which the target object travels in the vicinity of a boundary between the zones Z1 and Z2 or in the vicinity of a boundary between the zones Z2 and Z3, when the position of the target object frequently changes between the zones Z1 and Z2 or between the zones Z2 and Z3, in some cases, the azimuth angle θl (or θr) may be frequently changed between the angles θn and θw (or between the angles −θn and −θw). In this case, the switching of the combined image is frequently performed (chattering occurs), and there is a possibility that the driver feels bothered by how the combined image is switched. In view of the above, the value of the distance D1 at the time when the target object enters the zone Z1 from the zone Z2 may be set to D1in (for example, 15 m), and the value of the distance D1 at the time when the target object enters the zone Z2 from the zone Z1 may be set to D1out (for example, 17 m) which is larger than D1in. Similarly, the value of the distance D2 at the time when the target object enters the zone Z2 from the zone Z3 may be set to D2in (for example, 30 m), and the value of the distance D2 at the time when the target object enters the zone Z3 from the zone Z2 may be set to D2out (for example, 34 m) which is larger than D2in. That is, hysteresis may be introduced to the distances D1 and D2. In this manner, the occurrence of the chattering can be suppressed.

As another example, when the combined image is switched along with the change of the azimuth angle θl (or θr), the ECU 10 may be configured to prevent the azimuth angle θl (or θr) from being changed (that is, prevent the combined image from being switched) until a predetermined period (>T) elapses even when a condition for changing the azimuth angle θl (or θr) is satisfied during this period. Even with this configuration, the occurrence of the chattering can be suppressed.

Moreover, the image control system 1 may include a distance measurement sensor, such as a radar, an ultrasonic sensor, or a laser radar. In this manner, a computation accuracy of the distance to the object is improved.

Moreover, the ECU 10 may be configured to display, in a part of the display 12a, a bird's-eye view (view of FIG. 5A or FIG. 5B) for illustrating the current effective ranges Rrea, Rla, and Rra. This display may be constantly performed during a period in which the ignition switch is turned on, or may be performed only when the combined image is switched.

Moreover, the ECU 10 may be configured to prevent the combined image from being displayed on the display 12a when the own vehicle V is in the stop state or travels at low speed, and to display the combined image on the display 12a only when the own vehicle V travels at relatively middle-level vehicle speed or at high speed. The reason is as follows. The case in which the own vehicle V is in the stop state or travels at low speed is typically a case in which the own vehicle V is waiting for a traffic light to change or the own vehicle V is caught in a traffic jam. In such a case, a possibility that the target object of each of the lanes L, Ll, and Lr affects the traveling of the own vehicle V is relatively low (that is, the necessity to display the combined image is not so high).

In this case, the ECU 10 may determine the azimuth angle θl (or θr) with reference to a matrix (not shown) in which a leftmost vertical column (that is, a column indicating components in a case in which the target object of the own lane L is positioned in the zone Z1) of the matrix M1 (or M2) is deleted.

With this configuration, the configuration of the image control system can be simplified, and hence the cost can be reduced.

Moreover, the present disclosure can also be applied to a vehicle traveling by autonomous driving (autonomous driving control).

What is claimed is:
1. An image control system, comprising:
a rear image pickup device configured to pick up images of an object and a dividing line which are present in a rear image pickup range expanding on a rear side of a vehicle;
a left rear image pickup device configured to pick up images of an object and a dividing line which are present in a left rear image pickup range expanding on a left rear side of the vehicle and partially overlapping the rear image pickup range;
a right rear image pickup device configured to pick up images of an object and a dividing line which are present in a right rear image pickup range expanding on a right rear side of the vehicle and partially overlapping the rear image pickup range;
a display device including a display screen; and
an image control device configured to:
acquire rear image data obtained by picking up the images by the rear image pickup device, left rear image data obtained by picking up the images by the left rear image pickup device, and right rear image data obtained by picking up the images by the right rear image pickup device;
generate a combined image having a panorama format based on the rear image data, the left rear image data, and the right rear image data; and
display the combined image on the display screen of the display device, wherein, when, in the rear image pickup range, the left rear image pickup range, and the right rear image pickup range, image pickup ranges to be used for generating the combined image are defined as a rear effective range, a left rear effective range, and a right rear effective range, respectively, when, in a case in which a direction of an optical axis of the rear image pickup device is set as a rear reference direction, among boundary lines defining a horizontal angle of view of the rear effective range, an angle from the rear reference direction of a rear left-side boundary line being the boundary line on a left side of the vehicle is defined as a rear left-side azimuth angle and an angle from the rear reference direction of a rear right-side boundary line being the boundary line on a right side of the vehicle is defined as a rear right-side azimuth angle, respectively, when, in a case in which a direction of an optical axis of the left rear image pickup device is set as a left rear reference direction, among boundary lines defining a horizontal angle of view of the left rear effective range, an angle from the left rear reference direction of a left rear inner-side boundary line being the boundary line on an inner side in a vehicle width direction of the vehicle is defined as a left rear inner-side azimuth angle, and when, in a case in which a direction of an optical axis of the right rear image pickup device is set as a right rear reference direction, among boundary lines defining a horizontal angle of view of the right rear effective range, an angle from the right rear reference direction of a right rear inner-side boundary line being the boundary line on an inner side in the vehicle width direction of the vehicle is defined as a right rear inner-side azimuth angle, the image control device is configured to:
  allow the rear effective range to be changed by changing magnitudes of the rear left-side azimuth angle and the rear right-side azimuth angle independently of each other within a range of a horizontal angle of view of the rear image pickup device;
  allow the left rear effective range to be changed by changing a magnitude of the left rear inner-side azimuth angle within a range of a horizontal angle of view of the left rear image pickup device;
  allow the right rear effective range to be changed by changing a magnitude of the right rear inner-side azimuth angle within a range of a horizontal angle of view of the right rear image pickup device; and
  calculate, based on the dividing line detected from each of the rear image data, the left rear image data, and the right rear image data, a position and a shape of each of an own lane on which the vehicle is positioned, a left lane adjacent to the own lane on the left side thereof, and a right lane adjacent to the own lane on the right side thereof, and wherein, when the image control device is to generate the combined image, the image control device is configured to:
  identify a rear target object, a left rear target object, and a right rear target object which are objects closest to the vehicle in the own lane, the left lane, and the right lane, respectively, among the objects positioned on the rear side with respect to a rear end portion of the vehicle, which are detected from the rear image data, the left rear image data, and the right rear image data;
  change the magnitude of the rear left-side azimuth angle based on a combination of presence or absence of the rear target object and a level of closeness to the rear target object and presence or absence of the left rear target object and a level of closeness to the left rear target object;
  change the magnitude of the rear right-side azimuth angle based on a combination of the presence or absence of the rear target object and the level of closeness to the rear target object and presence or absence of the right rear target object and a level of closeness to the right rear target object;
  change, when the magnitude of the rear left-side azimuth angle or the rear right-side azimuth angle is changed to a relatively small value, the magnitude of the left rear inner-side azimuth angle or the right rear inner-side azimuth angle to a relatively large value, respectively, so as to generate the combined image; and
  change, when the magnitude of the rear left-side azimuth angle or the rear right-side azimuth angle is changed to a relatively large value, the magnitude of the left rear inner-side azimuth angle or the right rear inner-side azimuth angle to a relatively small value, respectively, so as to generate the combined image.

2. The image control system according to claim 1, wherein the image control device is configured to:
  allow the rear left-side azimuth angle to be changed between a first rear left-side angle and a second rear left-side angle having a magnitude larger than a magnitude of the first rear left-side angle;
  allow the rear right-side azimuth angle to be changed between a first rear right-side angle and a second rear right-side angle having a magnitude larger than a magnitude of the first rear right-side angle;
  allow the left rear inner-side azimuth angle to be changed between a first left rear inner-side angle and a second left rear inner-side angle having a magnitude larger than a magnitude of the first left rear inner-side angle; and
  allow the right rear inner-side azimuth angle to be changed between a first right rear inner-side angle and a second right rear inner-side angle having a magnitude larger than a magnitude of the first right rear inner-side angle.

3. The image control system according to claim 1, wherein the image control device is configured to:
  set an imaginary projection surface orthogonal to a tread surface of the vehicle at a position separated away from the rear end portion of the vehicle rearward by a predetermined projection distance determined as a fixed value; and
  generate, as the combined image, an image obtained by projecting, onto the imaginary projection surface, the object and the dividing line present in each of the rear effective range, the left rear effective range, and the right rear effective range through use of a viewpoint as a reference, the viewpoint being imaginarily set on the vehicle or in vicinity thereof, and wherein, when the image control device is to generate the combined image, the image control device is configured to change each of the rear left-side azimuth angle, the left rear inner-side azimuth angle, the rear right-side azimuth angle, and the right rear inner-side azimuth angle so that a left-side intersection and a right-side intersection are positioned on the imaginary projection surface in plan view of the vehicle, the left-side intersection being an intersection between the rear left-side boundary line and the left rear inner-side boundary line, the right-side intersection being an intersection between the rear right-side boundary line and the right rear inner-side boundary line.

4. The image control system according to claim 3, wherein, when a region between a first straight line passing through the rear end portion of the vehicle and extending in the vehicle width direction of the vehicle and a second straight line separated away from the first straight line rearward by a predetermined first distance and in parallel to the first straight line is defined as a first zone, a region between the second straight line and a third straight line separated away from the first straight line rearward by a predetermined second distance and in parallel to the first straight line is defined as a second zone, and a region on the rear side with respect to the third straight line is defined as a third zone, the predetermined projection distance is longer than the predetermined first distance and is shorter than the predetermined second distance, and wherein, when an intersection between the imaginary projection surface and a left imaginary line extending rearward from a left rear corner portion of the vehicle so as to be parallel to a longitudinal axis of the vehicle is defined as a first intersection, and an intersection between the imaginary projection surface and a right imaginary line extending rearward from a right rear corner portion of the vehicle so as to be parallel to the longitudinal axis of the vehicle is defined as a second intersection, in a case in which the magnitude of the rear left-side azimuth angle or the rear right-side azimuth angle is changed to the relatively small value, in plan view of the vehicle, the left-side intersection or the right-side intersection is positioned on the first intersection or in vicinity thereof, or on the second intersection or in vicinity thereof, respectively, and in a case in which the magnitude of the rear left-side azimuth angle or the rear right-side azimuth angle is changed to the relatively large value, the left-side intersection or the right-side intersection is positioned at a position separated away from the first intersection or the second intersection outward in the vehicle width direction of the vehicle, respectively, by a predetermined distance equal to or larger than a general lane width.

5. The image control system according to claim 4, wherein the predetermined projection distance is smaller than ½ of a sum of the predetermined first distance and the predetermined second distance.

6. The image control system according to claim 4, wherein the image control device is configured to:
change the magnitude of the rear left-side azimuth angle to the relatively large value when the rear target object is positioned in the first zone and the left rear target object is positioned on the rear side with respect to the first zone; and
change the magnitude of the rear right-side azimuth angle to the relatively large value when the rear target object is positioned in the first zone and the right rear target object is positioned on the rear side with respect to the first zone.

7. The image control system according to claim 4, wherein the image control device is configured to:

change the magnitude of the rear left-side azimuth angle to the relatively large value when the rear target object is positioned in the first zone and the left rear target object is absent; and
change the magnitude of the rear right-side azimuth angle to the relatively large value when the rear target object is positioned in the first zone and the right rear target object is absent.

8. The image control system according to claim 4, wherein the image control device is configured to:
change the magnitude of the rear left-side azimuth angle to the relatively small value when both of the rear target object and the left rear target object are positioned in the first zone; and
change the magnitude of the rear right-side azimuth angle to the relatively small value when both of the rear target object and the right rear target object are positioned in the first zone.

9. The image control system according to claim 4, wherein the image control device is configured to:
change the magnitude of the rear left-side azimuth angle to the relatively large value when both of the rear target object and the left rear target object are positioned in the third zone;
change the magnitude of the rear right-side azimuth angle to the relatively large value when both of the rear target object and the right rear target object are positioned in the third zone;
change the magnitude of the rear left-side azimuth angle to the relatively large value when the rear target object is absent and the left rear target object is positioned in the third zone; and
change the magnitude of the rear right-side azimuth angle to the relatively large value when the rear target object is absent and the right rear target object is positioned in the third zone.

10. The image control system according to claim 1, wherein, when the image control device is to generate the combined image, the image control device is configured to:
change the rear left-side azimuth angle and the left rear inner-side azimuth angle continuously when changing the rear left-side azimuth angle and the left rear inner-side azimuth angle; and
change the rear right-side azimuth angle and the right rear inner-side azimuth angle continuously when changing the rear right-side azimuth angle and the right rear inner-side azimuth angle.

11. The image control system according to claim 2, wherein the image control device is configured to:
set an imaginary projection surface orthogonal to a tread surface of the vehicle at a position separated away from the rear end portion of the vehicle rearward by a predetermined projection distance determined as a fixed value; and
generate, as the combined image, an image obtained by projecting, onto the imaginary projection surface, the object and the dividing line present in each of the rear effective range, the left rear effective range, and the right rear effective range through use of a viewpoint as a reference, the viewpoint being imaginarily set on the vehicle or in vicinity thereof, and wherein, when the image control device is to generate the combined image, the image control device is configured to change each of the rear left-side azimuth angle, the left rear inner-side azimuth angle, the rear right-side azimuth angle, and the right rear inner-side azimuth angle so that a left-side intersection and a right-side intersection are positioned on the imaginary projection surface in plan view of the vehicle, the left-side intersection being an intersection between the rear left-side boundary line and the left rear inner-side boundary line, the right-side intersection being an intersection between the rear right-side boundary line and the right rear inner-side boundary line.

* * * * *